United States Patent
Alstrup et al.

(10) Patent No.: US 8,078,946 B2
(45) Date of Patent: Dec. 13, 2011

(54) DISTRIBUTION METHOD, PREFERABLY APPLIED IN A STREAMING SYSTEM

(75) Inventors: Stephen Alstrup, Bagsvaerd (DK); Theis Rauhe, Copenhagen K (DK)

(73) Assignee: Codemate A/S (DK)

( * ) Notice: Subject to any disclaimer, the term of this patent is extended or adjusted under 35 U.S.C. 154(b) by 0 days.

(21) Appl. No.: 12/951,263

(22) Filed: Nov. 22, 2010

(65) Prior Publication Data

US 2011/0066749 A1    Mar. 17, 2011

(51) Int. Cl.
 *H03M 13/00*    (2006.01)
(52) U.S. Cl. .................... 714/784; 709/231
(58) Field of Classification Search .......... 709/230, 709/231, 205; 380/28; 370/256; 714/784, 714/701, 761
See application file for complete search history.

(56) References Cited

U.S. PATENT DOCUMENTS

| | | | |
|---|---|---|---|
| 6,073,250 A * | 6/2000 | Luby et al. .............. | 714/6.32 |
| 6,081,909 A * | 6/2000 | Luby et al. .............. | 714/701 |
| 6,633,911 B1 | 10/2003 | Matsuzaki et al. | |
| 7,036,138 B1 | 4/2006 | Tash | |
| 7,149,893 B1 | 12/2006 | Leonard et al. | |
| 7,474,631 B2 * | 1/2009 | Dube et al. ............. | 370/254 |
| 7,827,296 B2 * | 11/2010 | Zuckerman et al. ..... | 709/230 |
| 7,865,609 B2 * | 1/2011 | Liu et al. ............... | 709/231 |
| 2002/0085030 A1 | 7/2002 | Ghani | |
| 2002/0087592 A1 | 7/2002 | Ghani | |
| 2002/0129159 A1 | 9/2002 | Luby et al. | |
| 2003/0093548 A1 | 5/2003 | Cinghita et al. | |
| 2003/0126056 A1 | 7/2003 | Hausman et al. | |
| 2003/0226089 A1 | 12/2003 | Rasmussen et al. | |
| 2004/0107242 A1 | 6/2004 | Vert et al. | |
| 2005/0004985 A1* | 1/2005 | Stochosky .............. | 709/205 |
| 2005/0004995 A1 | 1/2005 | Stochosky | |
| 2005/0281404 A1* | 12/2005 | Yu ....................... | 380/28 |
| 2006/0153100 A1* | 7/2006 | Dube et al. ............. | 370/256 |
| 2006/0173965 A1* | 8/2006 | Yang .................... | 709/206 |

OTHER PUBLICATIONS

Byers J W et al: "A Digital Fountain Approach to Reliable Distribution of Bulk Data" Computer Communication Review, Association for Computing Machinery, New York, US, vol. 28, No. 4, Oct. 1998, pp. 56-67, XP000914424; ISSN: 0146-4833.
Byers J W et al: "A Digital Fountain Approach to Asynchronous Reliable Multicast" IEEE Journal on Selected Areas in Communications, IEEE Inc. New York, US, vol. 20, No. 8, Oct. 2002, pp. 1528-1540; XP001168306; ISSN: 0733-8716.
James S. Plank, et al.: "On the Practical Use of LDPC Erasure Codes for Distributed Storage Applications" UT-CS-03-510, 'Online! vol. -, Sep. 20, 2003, pp. 1-15, XP002302221; Retrieved from the Internet URL:http://www.cs.utk/edu/{plank/plank/papers/CS-03-510.html>.
Geoffrey Fox, et al.; "A Scaleable Event Infrastructure for Peer to Peer Grids"; Nov. 3 5, 2002; pp. 66-75.
Nazareno Andrade, et al.; "OurGrid: An Approach to Easily Assemble Grids with Equitable Resource Sharing"; JSSPP 2003, LNCS 2862, pp. 61-86, 2003; Springer-Verlag Berlin Heidelberg 2003.
International Search Report; PCT/DK2004/000197; Nov. 11, 2004.

* cited by examiner

Primary Examiner — David Ton
(74) Attorney, Agent, or Firm — Cantor Colburn LLP

(57) ABSTRACT

The invention relates to a data live streaming system comprising at least one data live streaming broadcaster LSB and at least two live streaming recipients LSR, said at least two live streaming recipients LSR forming at least a part of a peer-to-peer streaming network and said at least two live streaming recipients LSR each comprising means for generation of peer-to peer streaming to other live streaming recipients LSR of said peer-to peer streaming network and wherein said peer-to peer streaming to other streaming recipients LSR comprises loss resilient code representations of data from said at least one live streaming broadcaster LSB.

65 Claims, 11 Drawing Sheets

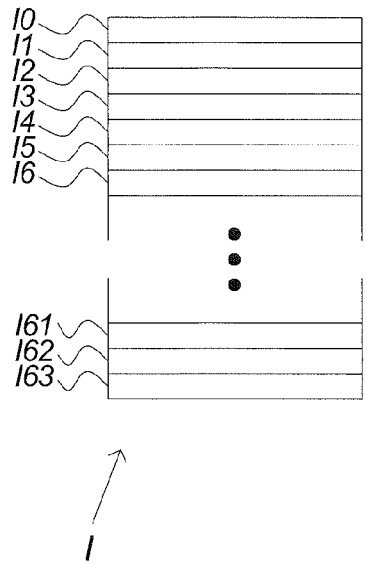
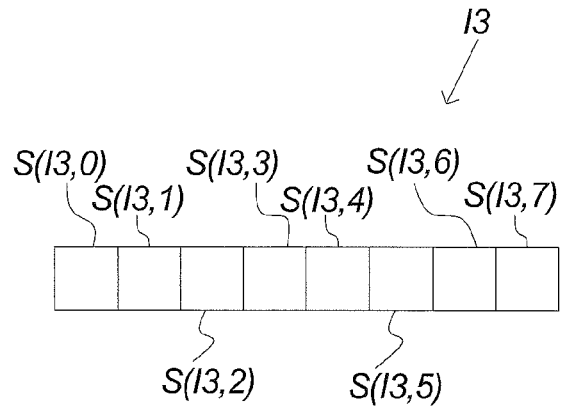
Fig. 6A
Fig. 6B
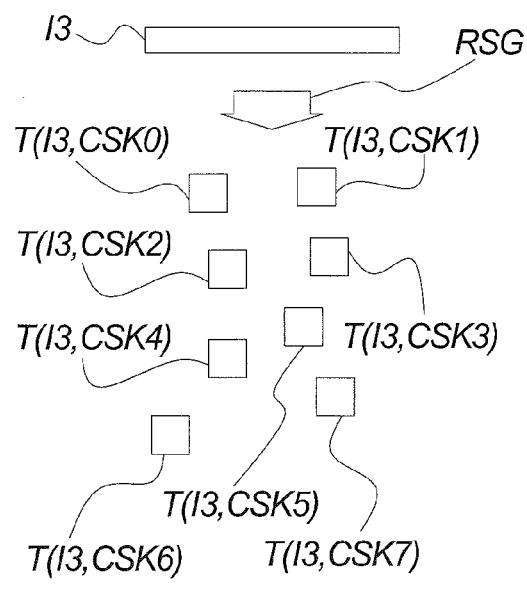
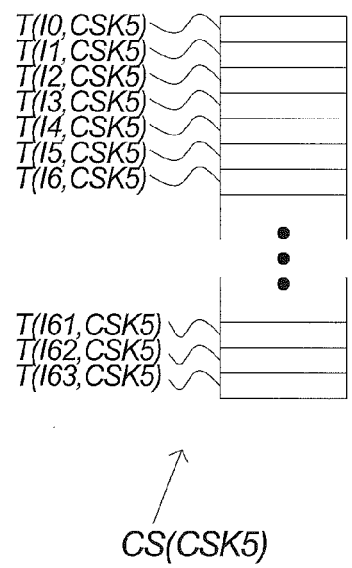
Fig. 6C
Fig. 6D

DISTRIBUTION METHOD, PREFERABLY APPLIED IN A STREAMING SYSTEM

CROSS REFERENCE TO RELATED APPLICATION

This application is related to and claims the benefit of U.S. patent application Ser. No. 12/503,437 filed on 15 Jul. 2009, now U.S. Pat. No. 7,865,811 issued 4 Jan. 2011, which is a continuation of U.S. patent application Ser. No. 10/593,942 filed on 22 Sep. 2006, now U.S. Pat. No. 7,581,158 issued 25 Aug. 2009, which is the U.S. national phase of International Patent Application Number PCT/DK2004/000197 filed on 22 Mar. 2004, the contents of all three of said patents/applications are herein incorporated by reference in their entirety.

FIELD OF THE INVENTION

The present invention relates to a data streaming system according to claim 1.

BACKGROUND OF THE INVENTION

A problem related to, e.g., video and/or audio streaming via the Internet is that a typical transmission system necessitates quite complex control and data bandwidth.

SUMMARY OF THE INVENTION

The present invention relates to a data live streaming system comprising at least one data live streaming broadcaster LSB and at least two live streaming recipients LSR, said at least two live streaming recipients LSR forming at least a part of a peer-to-peer streaming network and
said at least two live streaming recipients LSR each comprising means for generation of peer-to peer streaming to other live streaming recipients LSR of said peer-to peer streaming network and wherein said peer-to peer streaming to other streaming recipients LSR comprises loss resilient code representations of data from said at least one live streaming broadcaster LSB.

According to a general approach to loss resilient code representations, typically in the form of code segments, these codes broadly refer to codes which may modulate input data to a number of code segments of loss resilient codes of which a number of principally arbitrarily chosen code segments may be sufficient to recreate the complete input data. This number may, e.g., be fixed to a predetermined number if using for instance Reed-Solomon based codes or a number, which corresponds to a certain desired threshold value in connection with for instance LT based codes. It is generally the case that further codes segments may naturally be applied for the recreation, i.e. the decoding, of input data although such use of code segments will generally be regarded as superfluous.

Typically, a data live streaming system refers to a system, which streams data to a number of recipients so the streamed data are synchronised with a certain delay, preferably a very low delay. The synchronization facilitates broadcasting to a number of users via, e.g., the Internet or, e.g., an Intranet data transmission in a similar nature than that of conventional broadcasting of, e.g., audio and/or video.

According to the present invention a peer-to-peer network is to be understood broadly as any network of peers wherein all peers participates by contributing to the total system functionality. Thus a peer-to-peer network in the sense of the present invention may comprise, e.g., grid-technology based networks, server-based networks where the individual peers however contribute to the system functionality, networks where the individual peers contribute equally to the system functionality, etc.

The data live streaming system of the present invention may be used with really any number of live streaming recipients LSR, e.g. 5, 5.000, 1.000.000 or 500.000.000. The advantages become more significant the more recipients are serviced, but the system may be equally used for a video phone conference with 5, 10 or 20 participants, as for a live TV-show having 30.000, 300.000 or 3.000.000 viewers.

The coding algorithms made use of by the present invention may be based on any kind of forward error correcting codes, also referred to as erasure codes or loss resilient codes, or any other type of codes that permits on the basis of an input the generation of a number of packets whereof only a substantially arbitrary subset of a certain, not necessarily fixed, size, is required in order to be able to regenerate the input. Such codes may, e.g., comprise Reed-Solomon based codes, Tornado based codes, LT based codes, Raptor codes, etc. Further types of suitable codes are described in the literature, e.g. in IEEE Transactions on Information Theory paper "A Linear Time Erasure-Resilient Code With Nearly Optimal Recovery" by Alon and Luby, 1996, in Internet Society RFC-document 3453 "The Use of Forward Error Correction (FEC) in Reliable Multicast" by Luby et al., 2002, and in the patents of Digital Fountain, Inc., U.S. Pat. No. 6,307,487, U.S. Pat. No. 6,320,520, U.S. Pat. No. 6,373,406, U.S. Pat. No. 6,411,223, U.S. Pat. No. 6,486,803 and U.S. Pat. No. 6,614,366, hereby incorporated by reference.

It is, furthermore, noted that according to the present invention the term live streaming is to be understood broadly. It may, thus, basically apply to at least the following two situations. A first set-up where information is streamed substantially at the same time as it becomes available, e.g. when streaming a live TV-show, a soccer match or data from a data acquisition device, but not necessarily displayed on a monitor or used by the recipient at that same time, i.e. it may be stored at the recipients location for future use and/or presented immediately, thus obtaining that the streaming is substantially synchronized with the creation of the information. And a second set-up where the broadcaster has access to stored information, e.g. a movie, audio files or a computer program, and the information is streamed substantially in step with the information being displayed or used by the recipient, i.e. the streaming being substantially synchronized with the actual use of the information. In between or in addition to these set-ups are several additional possibilities, e.g. time-shifted streaming of live events. A further set-up within the scope of the term live streaming according to the present invention comprises several recipients receiving a stream substantially synchronously, independently of the kind content of the stream, e.g. a live event, a movie, database updates, a computer program, etc.

When, according to an embodiment of the invention, each of said at least two live streaming recipients LSR provides at least one unique partial encoded representation UPR of Input Data I by means of said means for generation of peer-to peer streaming to other streaming recipients, an advantageous embodiment of the present invention has been obtained.

When, according to an embodiment of the invention, at least two of said unique partial encoded representations UPR form a complete representation of data, an advantageous embodiment of the present invention has been obtained.

According to the invention, different loss resilient coding techniques may be applied and, moreover, different dimensional factors of the techniques may be applied. Thus, an encoding of input data may generally be dimensioned to be represented by a suitable chosen minimum number of code segments. For example, input data, that is data originating from the broadcaster, may be represented by, e.g., a minimum of hundred code segments. Typically, in such a case, a number larger than the chosen minimum of code segments must be generated allowing the recipient of the code segment to chose and utilize only a subset of the generated code segments, i.e. the minimum number. In this way loss of code segments or freedom to choose or obtain certain desired codes segments may be obtained. The minimum number may both refer to a specific number or, e.g., a percentage related to the number of encoded code segments. Thus, although the loss resilient coding technique facilitates generation of a larger number of code segments, the number of generated loss resilient segments is in a preferred embodiment, e.g., 8 per participating peer in a set-up where the complete representation may be established from, e.g., 64 loss resilient segments. However, the preferred number of loss resilient segments in a specific instance of a specific embodiment depends highly on several parameters such as data sizes, network type, the download, upload and processing capacities of the individual peers, which typically differ from one peer to another, the preferred data rate, etc.

When, according to an embodiment of the invention, said means for generation of peer-to peer streaming to other streaming recipients substantially provides M unique partial encoded representations UPR of Input Data I and wherein the streamed data from the live streaming broadcaster LSB is fully or substantially represented by a subset of N unique partial encoded representations UPR, an advantageous embodiment of the present invention has been obtained.

When, according to an embodiment of the invention, the number M substantially corresponds to the number of live streaming recipients LSR, an advantageous embodiment of the present invention has been obtained.

When, according to an embodiment of the invention, the streamed data from the at least one live streaming broadcaster LSB is fully represented by a subset of N unique partial encoded representations UPR encoded by Reed-Solomon based loss resilient code segments, an advantageous embodiment of the present invention has been obtained.

When, according to an embodiment of the invention, the streamed data from the live streaming broadcaster LSB is substantially represented by a subset of N unique partial encoded representations UPR encoded by LT-based based loss resilient code segments, an advantageous embodiment of the present invention has been obtained.

When, according to an embodiment of the invention, at least one of said at least two live streaming recipients LSR may regenerate the encoded data from said live streaming broadcaster LSB by decoding a number N unique partial encoded representations UPR of data and wherein at least one, preferably at least ten of said N unique partial encoded representations UPR, is generated by other live streaming recipients LSR, an advantageous embodiment of the present invention has been obtained.

When, according to an embodiment of the invention, said loss resilient code representations of data are provided in frames, an advantageous embodiment of the present invention has been obtained.

When, according to an embodiment of the invention, said frames comprise time frames substantially produced and transmitted sequentially by said live streaming broadcaster LSB, an advantageous embodiment of the present invention has been obtained.

When, according to an embodiment of the invention, the streaming of data to said at least one live streaming broadcaster LSB is structured in consecutive frames and wherein substantially each frame is initiated by an initial transmission of data representation to said at least two live streaming recipients LSR and wherein said at least two live streaming recipients LSR stream said data representations or derivatives thereof to other live streaming recipients LSR as loss resilient code segments and wherein recipients gather a number N of unique loss resilient code segments and regenerates said frame transmitted from said at least one live streaming broadcaster LSB as a live streaming signal, an advantageous embodiment of the present invention has been obtained.

When, according to an embodiment of the invention, said peer-to peer comprises a grid based system, an advantageous embodiment of the present invention has been obtained.

When, according to an embodiment of the invention, said data comprises video and/or audio streams, an advantageous embodiment of the present invention has been obtained.

The present invention further relates to a network comprising at least one Input Data I broadcaster IB and a plurality of peers P, said plurality of peers P transforming Input representative data IRD from said at least one Input broadcaster IB into a plurality of M unique partial encoded representations UPR of Input Data I, and wherein a plurality of code subsets W1, W2, W3, . . . of said M unique partial encoded representations comprises N different unique partial encoded representations UPR of said Input Data I, each subset W1, W2, W3, . . . representing said Input Data I and where N is less than M−1.

According to the invention, the plurality of code subsets typically comprises a very large number and most typically such subsets may be typically selected among any of the available M different unique partial encoded representations UPR.

It is noted that the network may comprise further peers not adapted for performing the overall desired de-central encoding/decoding of data.

It is, furthermore, noted that the number of N unique partial representations rather refer to a minimum number of representations and that further, typically redundant, representations may be included in the subsets if so desired.

According to a preferred embodiment of the invention, a unique partial encoded representation is unique in the sense that the representation is encoded by means of a unique key.

A significant advantageous feature of the invention is that the distribution of unique partial encoded representations may be performed be very little or even no central control for the purpose of ensuring that an optional user of the produced partial encoded representation actually receives the needed coded information with little or preferably no redundancy of information, of course sometimes depending on the currently applied coding theorem. In other words, a possible user intending to gather at least one code subset may actually choose to gather N ultimately or at least one principle arbitrary partial encoded representations and then know that the complete input may be established by decoding according to the applied coding theorem. This feature is based on the fact that all available partial encoded representations are unique, at least generated by a unique key. Thus, in the case of a Reed-Solomon based encoding of the Input Data, a specific number, N, of unique arbitrary partial encoded representations may be gathered which enables regeneration of the complete Input Data. This would not be the case if different peers produced redundant encoded representations.

It should, however, be noted that several networks may be joined such that sub networks individually act according to the invention. In this way, uniqueness of the partial encoded representations may be ensured by blocking any communication of such partial encoded representations between the sub-networks. A sub-network may, e.g., comprise a geographically determined part of the Internet.

The coding algorithms made use of by the present invention may be based on any kind of forward error correcting codes, also referred to as erasure codes or loss resilient codes, or any other type of codes that permits on the basis of an input the generation of a number of packets whereof only a substantially arbitrary subset of a certain, not necessarily fixed, size, is required in order to be able to regenerate the input. Such codes may, e.g., comprise Reed-Solomon based codes, Tornado based codes, LT based codes, Raptor codes, etc. Further types of suitable codes are described in the literature, e.g. in IEEE Transactions on Information Theory paper "A Linear Time Erasure-Resilient Code With Nearly Optimal Recovery" by Alon and Luby, 1996, in Internet Society RFC-document 3453 "The Use of Forward Error Correction (FEC) in Reliable Multicast" by Luby et al., 2002, and in the patents of Digital Fountain, Inc., U.S. Pat. No. 6,307,487, U.S. Pat. No. 6,320,520, U.S. Pat. No. 6,373,406, U.S. Pat. No. 6,411,223, U.S. Pat. No. 6,486,803 and U.S. Pat. No. 6,614,366, hereby incorporated by reference.

When, according to an embodiment of the invention, each of said input peers produces one of said M unique partial encoded representations UPR of Input Data I, an advantageous embodiment of the present invention has been obtained.

When, according to an embodiment of the invention, at least one, preferably all of said code subsets W1, W2, W3 ... represents an encoded version of said Input Data I, an advantageous embodiment of the present invention has been obtained.

According to the invention, preferably the complete Input Data should be decodable by an authorised user or at least implicitly by first of all gathering a code subset by push or pull technique and then finally decoding the code subset. A user may, e.g., be a peer having sufficient information about the encoding or at least about the facilitated decoding in order to actually decode the information to such a degree that the decoded version or representation of the Input Data makes sense to the so-called user. Typically, a suitable code structure will facilitate that the encoded Input Data may be decoded completely.

When, according to an embodiment of the invention, at least one of said code subsets W1, W2, W3 ... is encoded by means of LT based codes, an advantageous embodiment of the present invention has been obtained.

One of several encoding techniques applicable according to an embodiment of the invention is the so-called LT-codes or Tornado codes. When the code subsets comprise unique partial encoded representations encoded by such coding techniques, a decoding of such codes partial representations will typically require that the subsets comprise encoded data packets corresponding to a data content, which is greater than the coded Input Data. The extent of the necessary available data packets of the code subsets depends primarily on the so-called threshold value associated to the chosen applied coding method, at least as long as the code subsets are unique partial encoded representations.

When, according to an embodiment of the invention, at least one of said code subsets W1, W2, W3 ... is encoded by means of Reed-Solomon based codes, an advantageous embodiment of the present invention has been obtained.

When, according to an embodiment of the invention, said network comprises at least two recipient peers RP, which may gather at least one of said subsets W1, W2, W3 ... and decode the at least one of said subsets W1, W2, W3 ... into data corresponding to the encoded data, an advantageous embodiment of the present invention has been obtained.

According to the invention, the gathered code subsets may advantageously be gathered by a user, a recipient peer RP for the purpose of regenerating the encoded Input Data. In other words, a transmission of Input Data from the broadcaster to a recipient peer is obtained and it is noted that the transmission is obtained by means of partial data processing performed by a plurality of peers other that the input broadcaster.

When, according to an embodiment of the invention, the gathering performed by said at least two recipient peers RP is performed on the basis of a request to at least one of the other peers, preferably a plurality of peers, an advantageous embodiment of the present invention has been obtained.

When, according to an embodiment of the invention, the gathering performed by said at least two recipient peers RP is performed on the basis of a push transmission performed by at least one of the other peers, preferably a plurality of peers, an advantageous embodiment of the present invention has been obtained.

When, according to an embodiment of the invention, at least one of said peers P forms a recipient peer RP, an advantageous embodiment of the present invention has been obtained.

When, according to an embodiment of the invention, said input representative data IRD is established at least partly by at least two intermediate peers IP, an advantageous embodiment of the present invention has been obtained.

According to the invention, the input representative data may advantageously be provided by at least two intermediate peers IP alone or in combination with the Input Data broadcaster in the sense that the input broadcaster advantageously may perform pre-encoding or some kind of preparation of the Input Data in some applications. Alternatively, all or the major part of the encoding may be distributed and performed by the intermediate peers.

When, according to an embodiment of the invention, said intermediate peers IP comprise further intermediate processing steps adapted for establishment of input representative data IRD, an advantageous embodiment of the present invention has been obtained.

The intermediate peers may, thus, advantageously be provided for processing and establishing of input representative data in one or several stages prior to the transforming of the input representative data into partial unique encoded representations. Such processing may, e.g., comprise further encoding/decoding, data multiplication, routing of the input representative data according to suitable routing routines.

When, according to an embodiment of the invention, at least one of said peers P forms an intermediate peer IP, an advantageous embodiment of the present invention has been obtained.

According to a preferred embodiment of the invention several peers may advantageously participate both on the processing of the input representative data, i.e. serve as so-called intermediate peers, and at the same time as one of the peers transforming Input Representative Data from the at least one Input broadcaster into a plurality of M unique partial encoded representations UPR of Input Data I. In other words, some peers may both act as two types of peers at the same time. Such a dual functionally must of course be facilitated by means of suitable parallel or serial structuring of the necessary code processing so that an effective transport of data from the input broadcaster to the peers is provided.

When, according to an embodiment of the invention, the total number of peers P is greater than 5, preferably greater than 50 and even more preferably greater than 200, and the number of intermediate peers IP is between $\frac{1}{5}$ and $\frac{1}{100}$ of the total number of peers and preferably between $\frac{1}{25}$ and $\frac{1}{50}$ of the total number of peers, an advantageous embodiment of the present invention has been obtained.

According to an embodiment of the invention, the number of intermediate peers should advantageously be optimized to perform the desired data distribution.

It is noted that according to the present invention the number of intermediate peers may however be anything from 2 to the total number of peers. The choice of intermediate peers typically depends highly on the specific instance of the specific embodiment, as it, e.g., depends on the download and upload capacity of the individual peers and other parameters, some of which are even likely to change during a streaming session.

When, according to an embodiment of the invention, said input representative data IRD is transmitted from said broadcaster IB to at least two intermediate peers IP, preferably at least four intermediate peers IP, an advantageous embodiment of the present invention has been obtained.

According to an embodiment of the invention data may be transmitted from the input broadcaster to at least two, preferably at least four intermediate peers. In this way, transmittal of data from the input broadcaster to individual data requesting peers may be distributed as a transmission between an input requesting peer and several data providers, i.e. the intermediate peers and optionally further peers.

It is noted that the understanding of a data-requesting peer is not necessarily strictly reduced to a data pull function in the sense that data pushing may also be facilitated by the system to a certain degree as long as it is ensured that the recipient of the input representative data actually wants the data.

When, according to an embodiment of the invention, said at least two intermediate peers IP receive a partial representation of said Input Data I only, an advantageous embodiment of the present invention has been obtained.

Although the principle will be illustrated basically in connection with a one-to-one transmission of data, a one-to many or even many-to-many transmission may be applied within the scope of the invention.

According to an embodiment of the invention the plurality of subsets typically reflects that the necessary number N of unique partial encoded representations may be combined by any or at least within a relatively large group of these partial encoded representations. Hence, it is preferred that all partial representations are unique, although a certain degree of controlling or grouping of the provided partial representations may suffice as long as it is ensured that the potential "users" may gather N unique different partial representations.

Hence, an important feature when for instance applying a Reed-Solomon encoding of the partial encoded representations is that Input information may only be regenerated/decoded if the recipient obtains a full description of the input. When applying other types of codes a certain probability threshold must be obtained, typically larger than 100% of the encoded Input Data.

When, according to an embodiment of the invention, the unique partial encoded representations UPR are generated by a plurality of different peers, an advantageous embodiment of the present invention has been obtained.

When, according to an embodiment of the invention, the uniqueness of the unique partial encoded representations UPR are ensured by producing the partial encoded representations UPR by different peers, an advantageous embodiment of the present invention has been obtained.

When, according to an embodiment of the invention, at least one peer P collects and transforms input representative data IRD into at least one unique partial encoded representation by a pull process, an advantageous embodiment of the present invention has been obtained.

When, according to an embodiment of the invention, at least one peer P collects and transforms input representative data IRD into at least one unique partial encoded representation by a push process, an advantageous embodiment of the present invention has been obtained.

According to the invention, the gathering of subsets at a peer may be performed both by means of a push and pull process. In other words, a peer may upon own motion decides to collect the desired code subset(s) or alternatively, the available system may push the needed code subset(s) downstream. In the preferred embodiment of the invention, the individual peers collect the data as a pull process, i.e. request other peers actively when data is needed.

When, according to an embodiment of the invention, said Input Data is transmitted from the at least one Input Data broadcaster IB on a real-time basis, an advantageous embodiment of the present invention has been obtained.

When, according to an embodiment of the invention, said Input Data I is transmitted from the at least one input broadcaster IB on a real-time basis in frames, an advantageous embodiment of the present invention has been obtained.

When, according to an embodiment of the invention, said network is a video streaming network, an advantageous embodiment of the present invention has been obtained.

When, according to an embodiment of the invention, said network is performing video-streaming on demand, an advantageous embodiment of the present invention has been obtained.

When, according to an embodiment of the invention, said network is performing live-video streaming, an advantageous embodiment of the present invention has been obtained.

When, according to an embodiment of the invention, said network is formed by the Internet and said peers P comprise computers communicating with the Internet, an advantageous embodiment of the present invention has been obtained.

When, according to an embodiment of the invention, at least one of said peers comprises a computer transforming input representative data IRD into at least one unique partial encoded representation UPR of Input Data I without gathering and/or utilizing partial encoded representation UPR of Input Data I produced by other peers, an advantageous embodiment of the present invention has been obtained.

Advantageously, some peers may simply act as de-central producers of partial encoded representation UPR of Input Data I without using the partial encoded representation UPR produced by other peers.

When, according to an embodiment of the invention, at least one of said peers may switch between
  at least one mode, where the peer both produces at least one partial encoded representation UPR and gathers partial encoded representations produced by other peers to obtain at least one code subset W1, W2, W3, . . . and decodes the at least one code subset W1, W2, W3, . . . , and
  at least one idle mode where the peer acts solely or primarily as a producer of at least one partial encoded representation UPR, an advantageous embodiment of the present invention has been obtained.

When, according to an embodiment of the invention, the peers are implicitly or explicitly defined in the input data I, an advantageous embodiment of the present invention has been obtained.

According to a preferred embodiment of the invention, the peers intended to form a part of the network, e.g. as transforming peers and/or intermediate peers and/or recipient peers, may be defined in the encoded/streamed data. This feature facilitates an advantageous and very convenient exchange of data from one peer to another and not least, an advantageous retrieval of partial encoded representations by the recipient peers.

When, according to an embodiment of the invention, the encoded input data I is associated to peer defining data, an advantageous embodiment of the present invention has been obtained.

When, according to an embodiment of the invention, said unique partial encoded representations UPR comprise loss resilient codes, an advantageous embodiment of the present invention has been obtained.

When, according to an embodiment of the invention, said Input Data comprises video streaming,
said broadcaster IB comprises a video streaming broadcaster and
at least two of said plurality of peers P comprise recipients of video streams, an advantageous embodiment of the present invention has been obtained.

The present invention further relates to a method of streaming data in a live streaming system according to any of the above-described embodiments, comprising at least one data live streaming broadcaster LSB and at least two live streaming recipients LSR,
said at least two live streaming recipients LSR forming at least a part of a peer-to-peer streaming network and
said at least two live streaming recipients LSR each comprising means for generation of peer-to peer streaming to other live streaming recipients LSR of said peer-to peer streaming network and wherein said peer-to peer streaming to other streaming recipients LSR is established by means of loss resilient code representations of data from said at least one live streaming broadcaster LSB.

The present invention further relates to a method of distributing input data I in a network according to any of above-described embodiments, comprising
    at least one Input Data broadcaster IB and
    a plurality of peers P
whereby said plurality of peers P transforms Input representative data IRD from said at least one Input broadcaster IB into a plurality of M unique partial encoded representations UPR of Input Data I,
and wherein a plurality of code subsets W1, W2, W3, . . . of said M unique partial encoded representations comprises N different unique partial encoded representations UPR of said Input Data I, each subset W1, W2, W3, . . . representing said Input Data I and where N is less than M−1.

The present invention further relates to the use of loss resilient codes in a data live streaming system according to any of the above-described embodiments.

The present invention further relates to the use of loss resilient codes in a network according to any of the above-described embodiments.

THE DRAWINGS

In the following, the invention will be described with reference to the drawings where FIG. 1A-1D illustrate basic principles of a network according to an embodiment of the invention, FIG. 2 illustrates a desirable intermediate state of distributing method according to an embodiment of the invention, FIG. 3 illustrates a simple method of achieving the above intermediate state, FIG. 4 illustrates different possible peer types applicable on a network according to an embodiment of the invention, FIG. 5 illustrates the overall principles of a preferred intermediate structure according to the invention, FIG. 6A-6D illustrate the process of establishing pre-stage input representative data according to a preferred embodiment of the invention, FIG. 7A-7B illustrate the generation of input representative data on the basis of pre-stage input representative data, FIG. 8A-8C illustrate the transforming of input representative data into unique partial encoded representations of input, FIG. 9 illustrates the reestablishment of input data by the transforming of the unique partial encoded representations into input data, FIG. 10 illustrates an encoding/decoding concept of an embodiment of the invention, and FIG. 11 illustrates an embodiment of the invention used for live streaming of video.

DETAILED DESCRIPTION

FIG. 1A illustrates a network comprising an Input broadcaster IB and a plurality of peers P. The plurality of peers P is adapted for transforming Input representative data IRD from said at least one Input broadcaster IB into a plurality of M unique partial encoded representations UPR of Input Data, The produced unique partial representations may, ideally arbitrarily, be combined into a large number of code subsets W1, W2, W3, of said M unique partial encoded representations each comprising N different unique partial encoded representations UPR of said Input Data.

In the present description it is emphasized that when reference is made to unique packets, unique representations, etc., the uniqueness typically regards the key by which the packet or representation is encoded rather than the data actually contained by the packet or representation. This distinction is important as two different keys by coincidence may result in two equal packets being established when used for encoding the same or different data block.

Figure 1A:
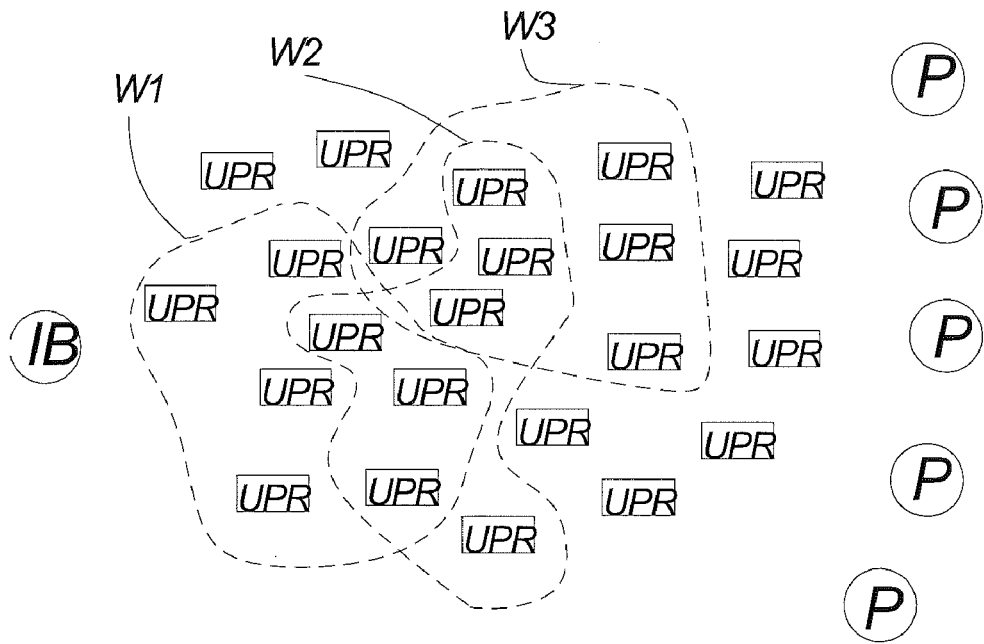
FIG. 1B illustrates a stage of the above-described network in which the input representative data IRD is transmitted from the Input broadcaster to the Peers P.
FIG. 1C illustrates that the peers P transform input representative data into unique partial encoded representations and avail them to the network.
FIG. 1D illustrates a preferred structure of an intermediate structure according to the invention.
Figure 1B:
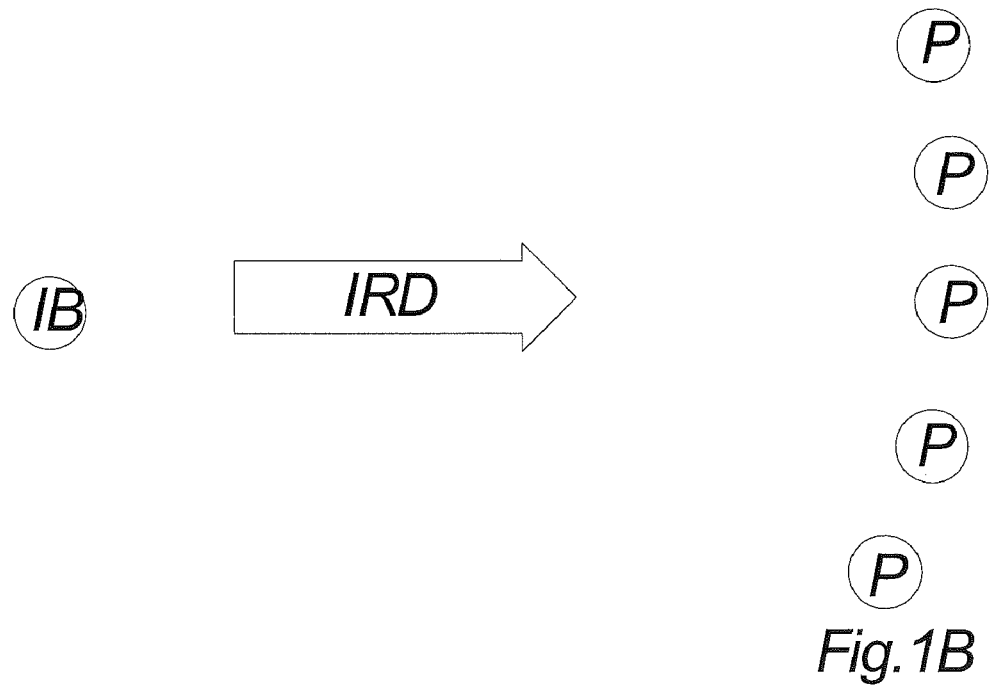
Figure 1C:
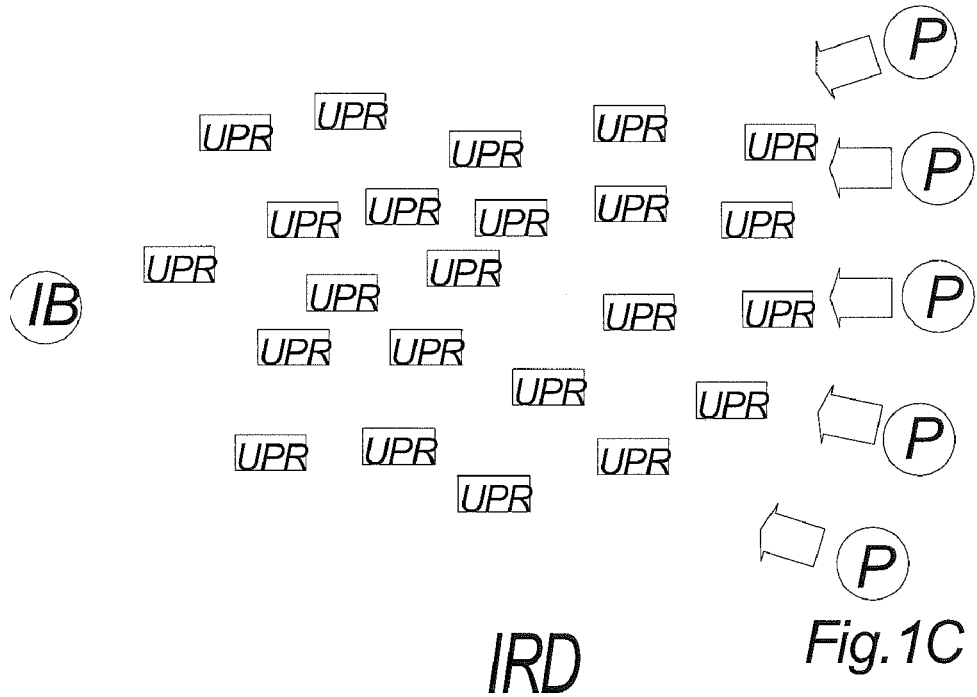
Figure 1D:
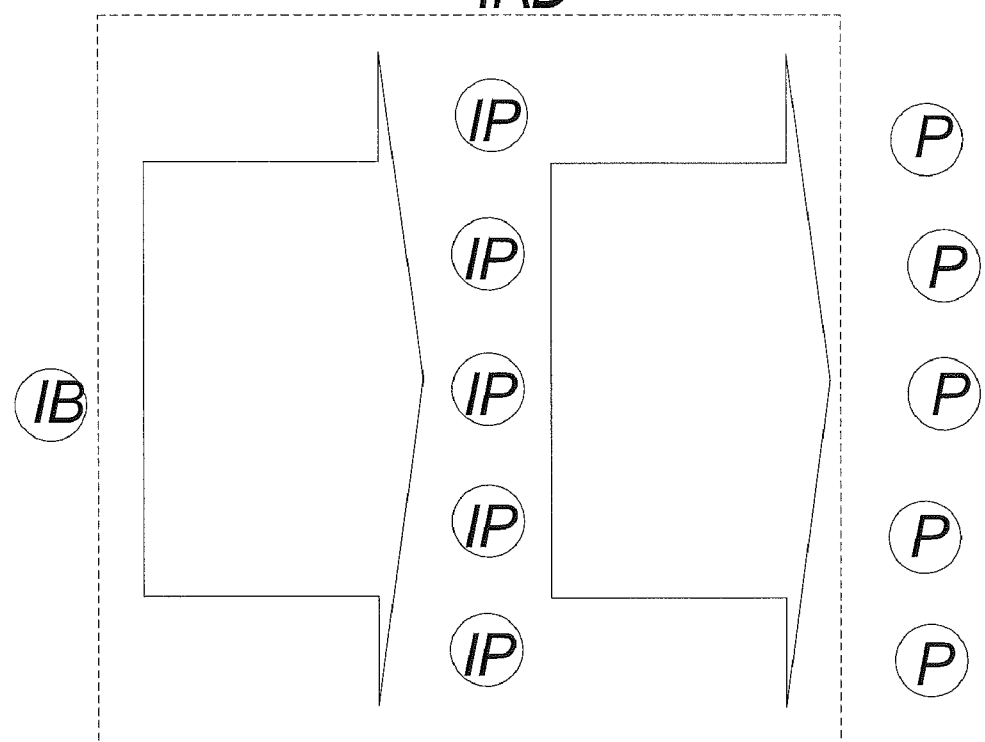
Figure 2:
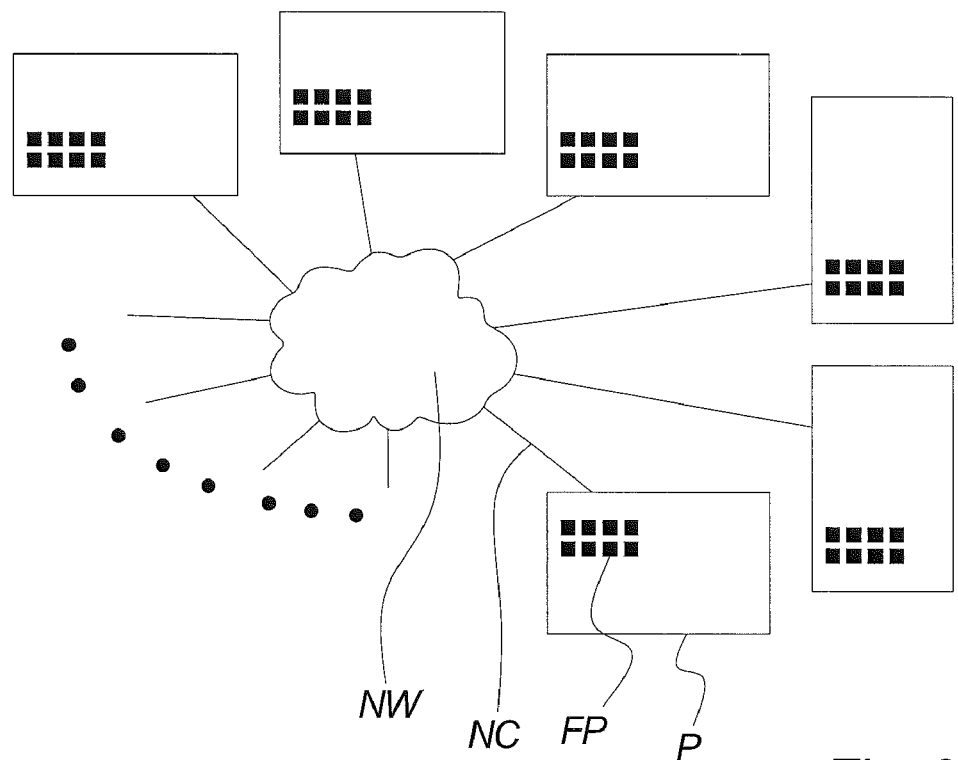

FIG. 2 illustrates a desirable intermediate state of distributing content using Reed-Solomon techniques. It comprises a network NW and a number of peers P connected to the network by means of network connections NC. Each peer comprises a number of feed packets FP, which number in the example of FIG. 2 is 8 feed packets. Each feed packet FP represents a Reed-Solomon symbol derived from an input in such a way that the input may be re-established on the basis of a certain number of feed packets, e.g. 64 packets. As the Reed-Solomon techniques facilitate a theoretically unlimited number of unique feed packets, any number of peers may be connected to the network, each comprising, e.g., 8 unique packets.

The situation illustrated in FIG. 2 is desirable because any of the peers P very quickly and reliably may collect the number of feed packets they lack, e.g. 56, in order to be able to re-establish the input. Due to the Reed-Solomon techniques the peers may collect any 56 packets from any of the other peers in order to obtain 64 packets, i.e. the number required for establishing the input.

Figure 3:
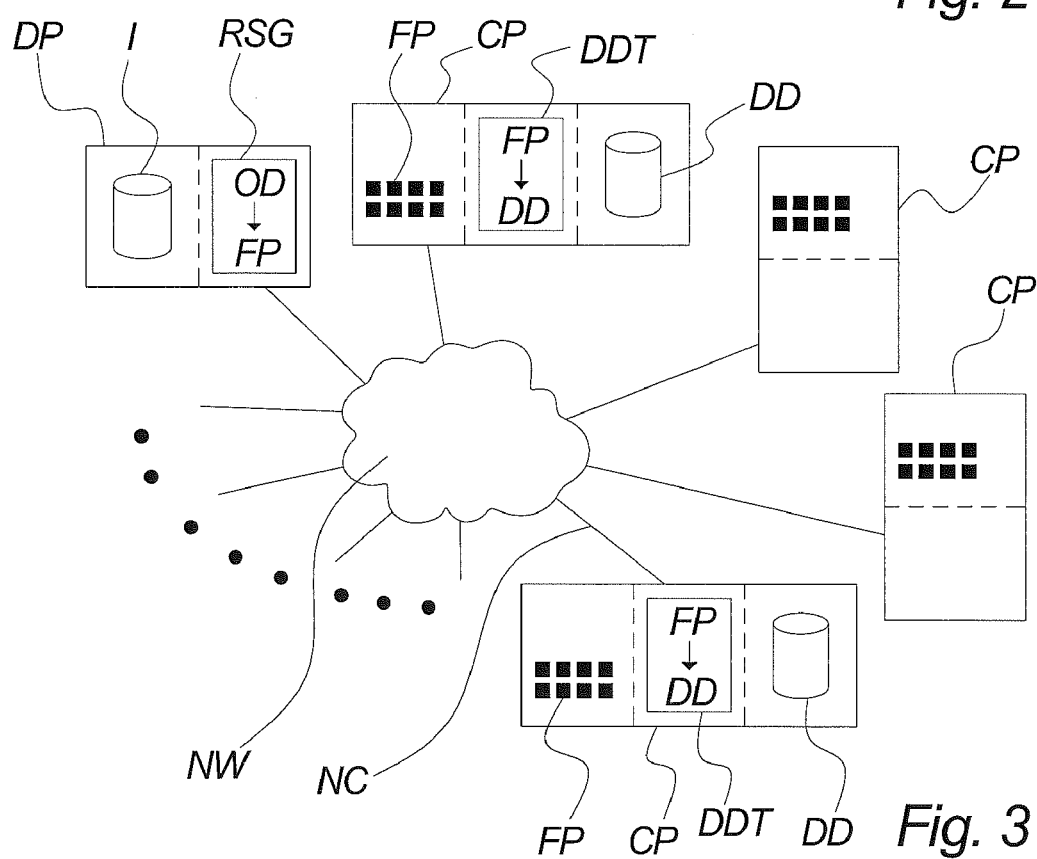

FIG. 3 illustrates a simple method of distributing the feed packets to the peers in order to achieve the desirable situation described above with reference to FIG. 2. It comprises a distributing peer DP comprising an input data I and a Reed-Solomon generator RSG generating feed packets FP from the input data I. The distributing peer is connected to a network NW by means of a network connection NC. FIG. 3 further comprises a number of client peers CP connected to the network NW by means of network connections NC.

The distribution peer DP may now generate unique feed packets FP from the input data I and send these feed packets to the client peers CP until the desirable situation of FIG. 2 is achieved. Some or all of the peers may further comprise delivered data transformers DDT enabling the peers to generate a delivered data DD from the feed packets FP once they have collected enough of these. The delivered data DD should preferably be equal to the input data I.

Figure 4:
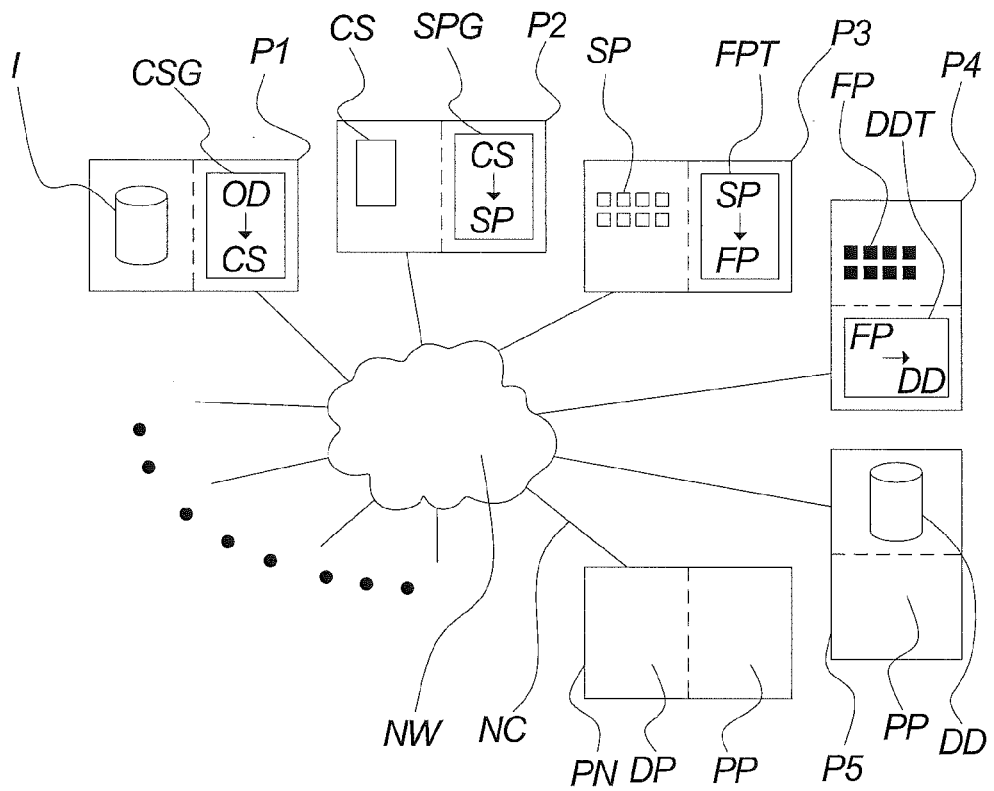

FIG. 4 illustrates some of the concepts that will be used to describe the data distribution method of the present invention. Typically, a number of peers P1 . . . P5, PN, are connected by means of network connections CN to each other by means of a network NW.

According to the present invention a peer P1 . . . P5, PN is typically embodied by a personal computer, e.g. a desktop computer comprising a central processing unit (CPU), storage means, memory, input means e.g. keyboard and computer mouse, a computer monitor, etc. It is, however, noted that a peer may be embodied by any means connectable to other peers by means of a network NW. Such alternative means may comprise servers, set-top boxes, personal digital assistants (PDA), mobile phones, laptops, network-enabled televisions, public information monitors, etc. Moreover, according to the present invention one computer or equivalent according to the above may comprise more than one peer. For this embodiment a computer comprising more than one peer, preferably also comprises more than one network connection NW. There is no limitation on the number of peers, which is also indicated by the peer referred to as PN and the small dots.

The network is preferably the Internet but may be any kind of network whether closed or open to public connections, e.g. local area networks (LAN), wide area networks (WAN). The network NW may be based on any network protocol, e.g. TCP/IP, IPX/SPX, etc., and may be travelling by cables, light guides, wireless communication, etc., or a combination thereof. The network NW may comprise hubs, switches, routers, or any other kinds of network units. The network connections NC may comprise any kind of network connections, e.g. UTP-cables, coaxial cables, light guides, wireless network, ADSL, cable-TV connections, ISDN, regular phone connections, etc., and any means for establishing such, e.g. network interface cards (NIC), hubs, routers, switches, wireless routers, modems, ADSL-modems, cable-modems, ISDN-modems, etc. The communication between the peers via the network connections and network may preferably be based on the Unreliable Datagram Protocol (UDP), which is a part of the TCP/IP protocol suite, but any other protocol or combination of protocols may be used in certain embodiments of the present invention.

Each peer P1 . . . P5, PN, according to the present invention, comprises with reference to the generic peer PN preferably a data part DP and a processing part PP. The data part and the processing part may, however, be utilized differently for the different peers.

Illustrated in FIG. 4 by peer P1, a peer may comprise within its data part DP a set of input data I. These are the data that should be distributed to other peers by the method of the present invention. For its processing part PP peer P1 comprises a code segment generator CSG that is adapted to generate code segments CS on the basis of the input data I.

According to the present embodiment the code segment is a pre-stage packet, which may be used for establishing further packets. It is noted that in other embodiments a code segment may denote a final-stage packet type or an alternative intermediate packet type.

A peer may alternatively or additionally comprise, as illustrated by peer P2, within its data part DP at least one code segment CS, and within its processing part PP a seed packet generator SPG. The code segment CS is generated by the code segment generator CSG of peer P1 and delivered by means of the network NW and network connections NC from peer P1 to peer P2. The seed packet generator SPG is adapted to generate seed packets SP on the basis of the code segment CS.

Furthermore a peer may alternatively or additionally comprise, as illustrated by peer P3, within its data part DP a number of seed packets SP delivered by means of the network and connections from peer P2 and other peers with the same capabilities to peer P3. In the conceptual overview of FIG. 4 are shown 8 seed packets. For its processing part PP peer P3 comprises a feed packet transformer FPT adapted to transform a number of seed packets SP into feed packets FP.

Furthermore, a peer may alternatively or additionally comprise, as illustrated by peer P4, within its data part DP a number of feed packets FP delivered by means of the network and connections from peer P3 and other peers with the same capabilities to peer P4. In the conceptual overview of FIG. 4 is shown 8 feed packets. For its processing part PP peer P4 comprises a delivered data transformer DDT adapted to transform a number of feed packets FP into delivered data DD, preferably equal to the input data I.

Finally, a peer may alternatively or additionally comprise, as illustrated by peer P5, within its data part DP a set of delivered data DD delivered by means of the network and connections from peer P4 and other peers with the same capabilities to peer P5. The delivered data DD is preferably equal to the input data DD. For its processing part PP peer P5 does not necessarily comprise any processing means adapted for use in the distribution process as the data now has been fully delivered, but the processing part may, however, comprise a code segment generator CSG as peer P1 in order to start over the distribution process, e.g. in a sub-network. Moreover, the processing part of peer P5 preferably comprises processing means for utilizing the delivered data DD, e.g. a streaming video viewer, etc.

It is noted that according to the present invention, one, several, or all of the above mentioned steps may be comprised within each or some of the peers. In fact the processing steps feed packet transformer FPT and delivered data transformer DDT, and the corresponding data parts seed packets SP, feed packets FP and delivered data DD is preferably comprised within the same peers. Thus, the work of peers P3, P4 and P5 in the conceptual diagram of FIG. 4 is preferably handled within one type of peer, which, however, preferably has several instances in the network.

Thus, a preferred distribution network according to the present invention comprises at least one peer corresponding to peer P1 of FIG. 4, a number of peers according to peer P2 of FIG. 4 and, furthermore, several peers each according to the aggregate of peers P3, P4 and P5 of FIG. 4.

Figure 5:
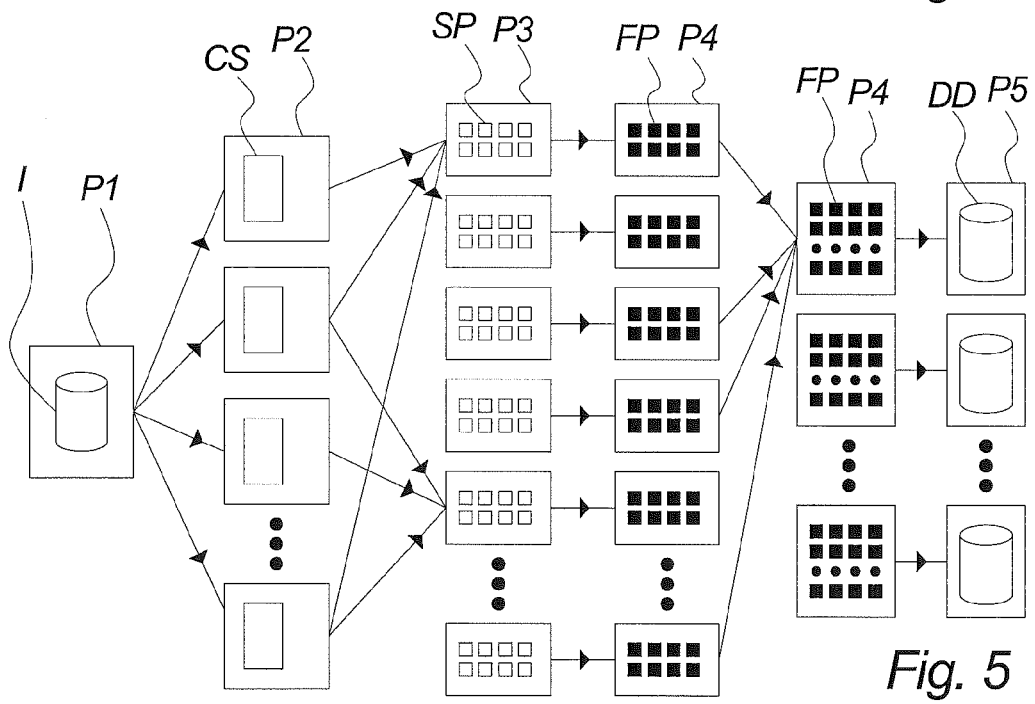

FIG. 5 illustrates a preferred embodiment of a distribution method of the present invention.

A peer P1 comprises input data I to be distributed. The peer P1 is, thus, also referred to as the distributing or broadcasting peer as it in this case acts as the broadcaster, even though in a preferred embodiment any of the peers may have any of the roles.

The peer P1 generates by means of a code segment generator CSG a number, e.g. 8, code segments CS, and transmits those to a number of peers P2. In a preferred embodiment of the invention, each code segment is generated on the basis of the whole input data I. In alternative embodiments some of all of the code segments may, however, be generated on the basis of only a part of the input data I.

In the simplest embodiment, each code segment CS is unique and necessary and the total size of all the code segments corresponds to the size of the input data I. The size of each code segment compared to the input data is thus the reciprocal of the number of necessary code segments, e.g. ⅛ of the input data when 8 necessary code segments are generated.

According to different implementations, more unique code segments than strictly needed and/or more copies of each code segment may be beneficial. The possible number of unique code segments is in theory unlimited, whereas in practical implementations typically dependent on the specific integer representation, e.g. 32 bit corresponding to $2^{32}$ possible unique code segments.

The total size of all the code segments CS transmitted from the broadcaster is at least the size of the input data I. The broadcaster, thus, has to transmit at least an amount corresponding to the amount of the input data I, but not necessarily more than that. By means of traditional distribution methods the broadcaster would have to transmit the whole input data to each of the end recipients, or the recipients would have to be arranged in a tree structure.

The peers P2 comprising the code segments CS generate seed packets SP by means of seed packet generators SPG. The seed packets are transmitted to peers P3. Each peer P3 receives seed packets from several peers P2, and the seed packets SP received by one peer P3 have to correspond to each other as regards the key by which they are generated. In order to ensure this correspondence the seed packets SP are preferably generated on request from the peers P3, which may then prescribe the key to use for generating seed packets SP delivered to the same peer P3.

In preferred embodiments where the code segments each are generated on the basis of the whole input data I, the seed packets SP also depend on the whole input data. In the alternative embodiments mentioned, the seed packets do not necessarily all depend on the whole input data.

Each peer P3 should receive a number of unique seed packets SP generated by means of corresponding keys. In the simplest embodiment described above where all code segments CS are unique and required, each peer P3 should receive a seed packet from each peer P2, i.e. seed packets originating from each code segment. When, e.g. 8 unique necessary code segments exist, each peer P3 should receive 8 seed packets SP.

The size of each seed packet compared to the code segments is preferably the reciprocal of the number of necessary code segments, e.g. ⅛ of the code segment size when 8 necessary code segments are generated and thus 1/64 of the input data.

In alternative embodiments where more than the necessary number of unique code segments exists, each peer P3 should receive at least a number of seed packets corresponding to the number of necessary code segments, but may preferably receive more seed packets in order to make the distribution method more reliable and resistant to lost packets.

In alternative embodiments where more copies of each code segment exist, the peers P3 should receive at least a number of seed packets originating from different code segments corresponding to the number of necessary code segments. The feed packet transformers FPT of the peers P3 need a certain number of seed packets with corresponding generating keys, originating from unique code segments.

In FIG. 5 is illustrated that not every peer P3 received packets from every peer P2, indicating that the number of peers P2 is greater than necessary.

The peers P3 each transforms a number of received unique seed packets SP into a number of unique feed packets FP by means of a feed packet transformer FPT. The established feed packets are transmitted to peers P4. In a preferred embodiment the peers P4 are, however, as mentioned above, the same peers as the peers P3.

Preferably, a certain number of seed packets SP transforms into the same number of feed packets FP. Thus, when, e.g., the necessary number of code segments CS is 8 and thus the number of seed packets received by each of the peers P3 correspondingly 8, the number of feed packets comprised by each of the peers P4 is 8.

As the seed packets generated for each of the peers P3 are preferably generated from a different key for each peer P3, the seed packet received by one peer P3 from a certain code segment CS is preferably different than a seed packet received by a different peer P3 from the same code segment CS. Thereby, it is ensured that numerous unique feed packets are established in the entire system.

The size of each feed packet is preferably the same as the size of each seed packet, and is, thus, e.g., ⅛ of the code segment size when 8 code segments are necessary and thus 1/64 of the input data.

When each of the peers P4 comprises a number of feed packets FP, e.g. 8 feed packets, the desirable intermediate state described above with reference to FIG. 2 is achieved. The rest of the distribution process comprises the peers P4 distributing the feed packets FP among themselves until a number of the peers P4 have collected a number of feed packets FP necessary to transform them into a delivered data DD preferably equal to the input data I.

In the simplest embodiment, the number of feed packets necessary to re-establish the input data I is the reciprocal of the feed packet size compared to the size of the input data. When, e.g., the feed packets have a size of 1/64 of the input data I, 64 unique feed packets are needed in order to transform them into the delivered data DD.

In alternative embodiments, the number of feed packets necessary in order to ensure re-establishment of the delivered data may be slightly greater than the reciprocal of their sizes, e.g. 68 unique feed packets.

FIGS. 6A to 9 illustrate how the different segments and packets described above may be established according to a Reed-Solomon based coding. This preferred embodiment is one of the simplest possible embodiments of the present invention. It is noted that the following description is only an example and that any numbers, sizes, etc., may be different in alternative embodiments.

FIGS. 6A to 6D illustrate the establishment of code segments CS. FIG. 6A illustrates an input data I divided into 64 parts I0, I1 . . . I63. In the present example the input data I is determined to be of size 64 kB, i.e. 65536 bytes. Each part I0, I1 ... I63 thus has a size of 1 kB, i.e. 1024 bytes. This size should preferably correspond to the size most easily handled by the network and network connections used for distributing the packets, and a size of 1 kB fits very well to the protocols and network components of TCP/IP-networks, e.g. the Internet.

FIG. 6B illustrates that each of the input data parts I0, I1 ... I63 is further divided into a number of sub-parts S, in the present example 8 sub-parts S which causes each sub-part to have a size of 128 bytes. In FIG. 6B the sub-parts of input data part I3 are shown. These sub-parts are, thus, denoted S(I3,0), S(I3,1) ... S(I3,7).

FIG. 6C illustrates the establishment of code segment parts T established from an input data part I3. Each code segment part T is established by means of a Reed-Solomon generator RSG and on the basis of a code segment key CSK0, CSK1 ... CSK7. The code segment parts established from input data part I3 are, thus, denoted T(I3,CSK0), T(I3, CSK1) ... T(I3,CSK7). The code segment keys CSK0, CSK1 ... CSK7 should be different and may have any value, thus allowing in theory an unlimited number of code segment parts T. The number of code segment keys used, in this example 8, determines the number of code segments generated. The code segment parts T in this example have a size of 128 bytes.

The process shown in FIG. 6C is carried out for each input data part I0, I1 ... I63, thus establishing in the present example a total of 8*64=512 code segment parts T.

FIG. 6D illustrates how certain code segment parts T are combined to form code segments CS. In FIG. 6D every code segment part generated on the basis of the same code segment key CSK5 is combined to form a code segment CS(CSK5). This code segment, thus, comprises a code segment part T(I0,CSK5) generated from the first input data part I0, a code segment part T(I1,CSK5) generated from the second input data part I1, and so forth. A code segment CS, thus, depends on the full input data I.

Every 512 code segment parts T are sorted as described above according to their code segment keys CSK0, CSK1 ... CSK7, and, thus, form 8 code segments CS(CSK0), CS(CSK1) ... CS(CSK7). Each code segment CS, thus, has a size of 64*128=8192 bytes=8 kB, which is ⅛ of the size of the input data I.

The code segments CS are preferably transmitted to different peers in order to initiate the distribution. The total size transmitted from the input data holding peer is, however, only the size of the input data, i.e. 8*8 kB=64 kB.

In more advanced embodiments of the present invention, more than the necessary 8 code segments may be generated by using more different code segment keys, i.e. CSK8, CSK9, CSK10, etc. According to the present invention, any 8 of the generated code segments are enough to proceed with the distribution process. Thus, by generating and transmitting, e.g. 12 code segments, up to 4 of the code segment holding peers may abandon their participation without jeopardizing the distribution process.

In an alternative more advanced embodiment of the present invention, the whole set of different code segments may be directly replicated, thus creating redundancy, and each copy of the code segment sets transmitted to different regions of the network. Thus, local copies of the necessary code segments may be established in each network region. Thereby, an advantageous method of avoiding network bottlenecks has been obtained.

Figure 7A:
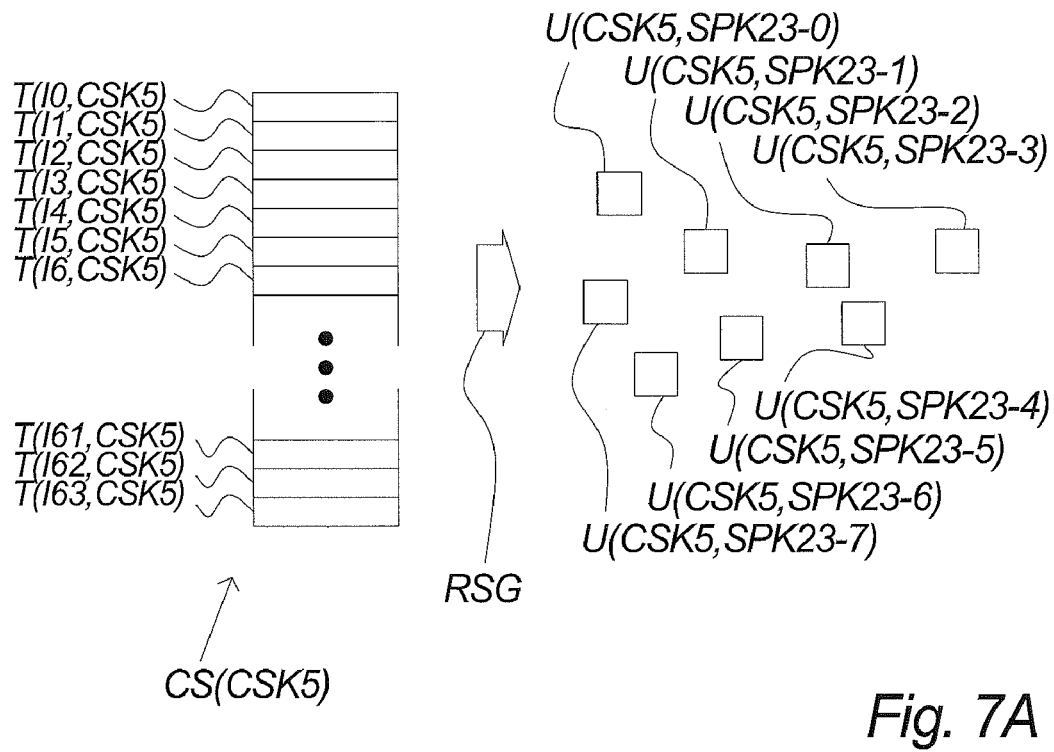
Figure 7B:
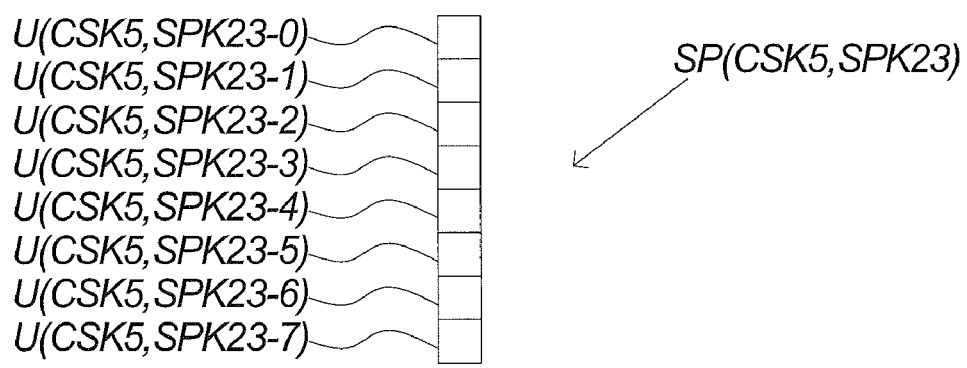

FIGS. 7A and 7B illustrate how seed packets SP may be generated on the basis of the code segments CS. FIG. 7A illustrates a code segment CS(CSK5) comprising 64 code segment parts T(I0,CSK5) ... T(I63,CSK5). By means of a Reed-Solomon generator RSG is now generated a number of seed packet parts U(CSK5,SPK23-0) ... U(CSK5,SPK23-7) on the basis of seed packet sub-keys SPK23-0, SPK23-1 ... SPK23-7. The seed packet sub-keys should be different and may have any value, thus allowing in theory an unlimited number of seed packet parts U. A pseudo-random process or any other process of establishing a possibly large number of different keys may preferably be used for generating the seed packet sub-keys. Each of the seed packet parts U has a size of 128 bytes, i.e. 1/64 of the size of the code segment CS.

FIG. 7B illustrates how the established seed packet parts U are combined into a seed packet SP(CSK5,SPK23). The seed packet, thus, gains a size of 8*128 bytes=1024 bytes=1 kB, i.e. ⅛ of the size of the code segment CS.

The seed packet sub-keys SPK23-0, SPK23-1 ... SPK23-7 are established from a seed packet key SPK23, which may have any value, thus allowing in theory an unlimited number of seed packet keys. The number 23 of the seed packet key of the present example symbolizes that an arbitrary seed packet key is used.

The distribution method of the present invention has to ensure that seed packets with the same seed packet key SPK23 is established for each code segment CS(CSK0) ... CS(CSK7). As the code segments CS are preferably located at different peers, some way to ensure the use of corresponding seed packet keys has to be obtained. In a preferred embodiment letting the peer to which a certain seed packet SP should be transmitted prescribe the seed packet key to use ensures this. When the peer prescribes the same key to all code segment peers it may receive seed packets established on the basis of the same key from each of the code segments. The sub-keys should be determined in a corresponding way in each of the code segment peers. In order to ensure that different seed packets receiving peers prescribe different seed packet keys, the peers may use some preferably unique representation of themselves, e.g. an ID-number, IP-address or MAC-address. The number 23 may denote such a unique representation of a specific peer.

Figure 8A:
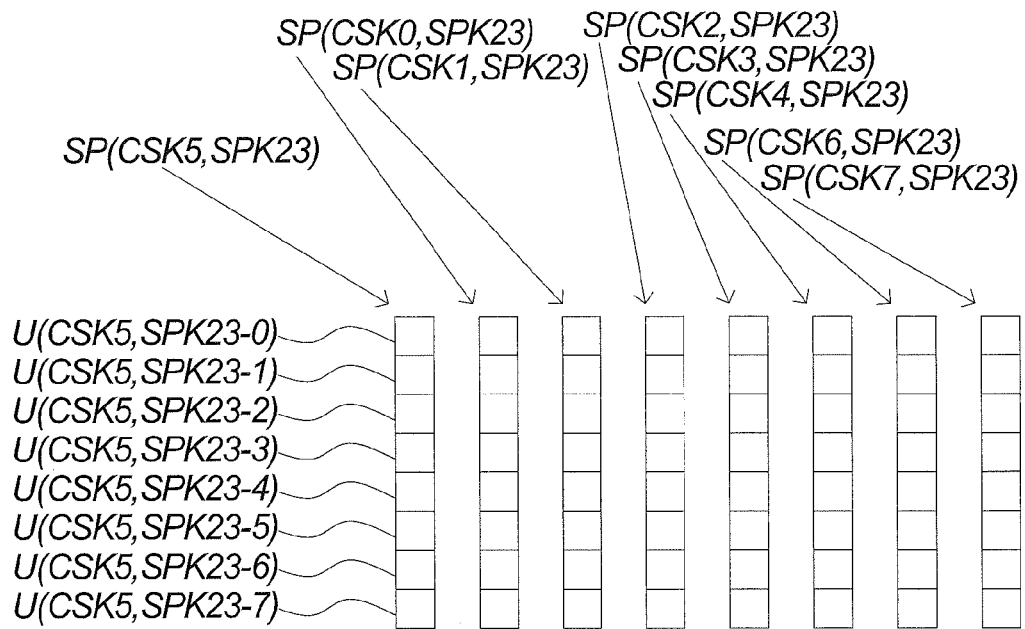
Figure 8B:
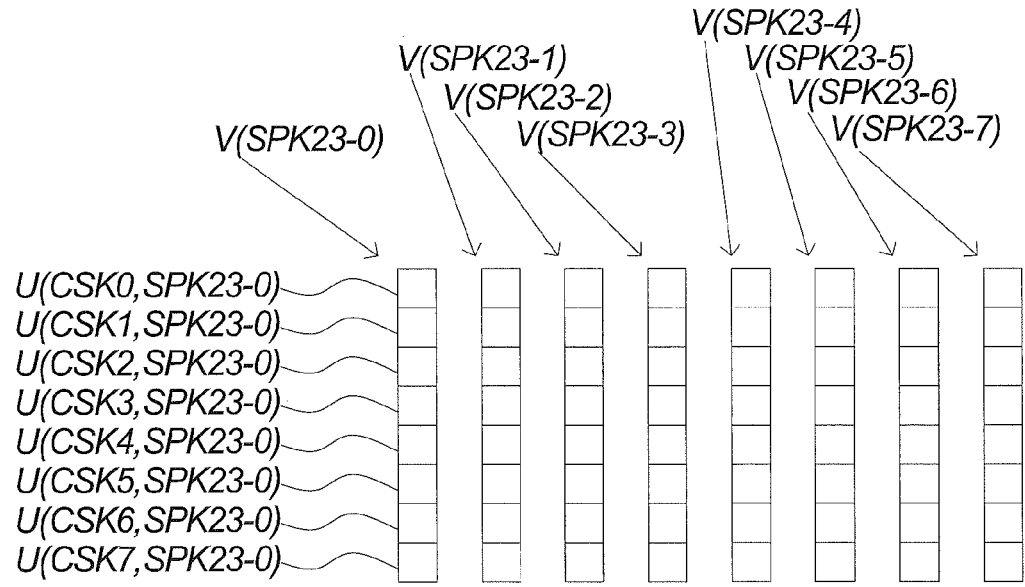
Figure 8C:
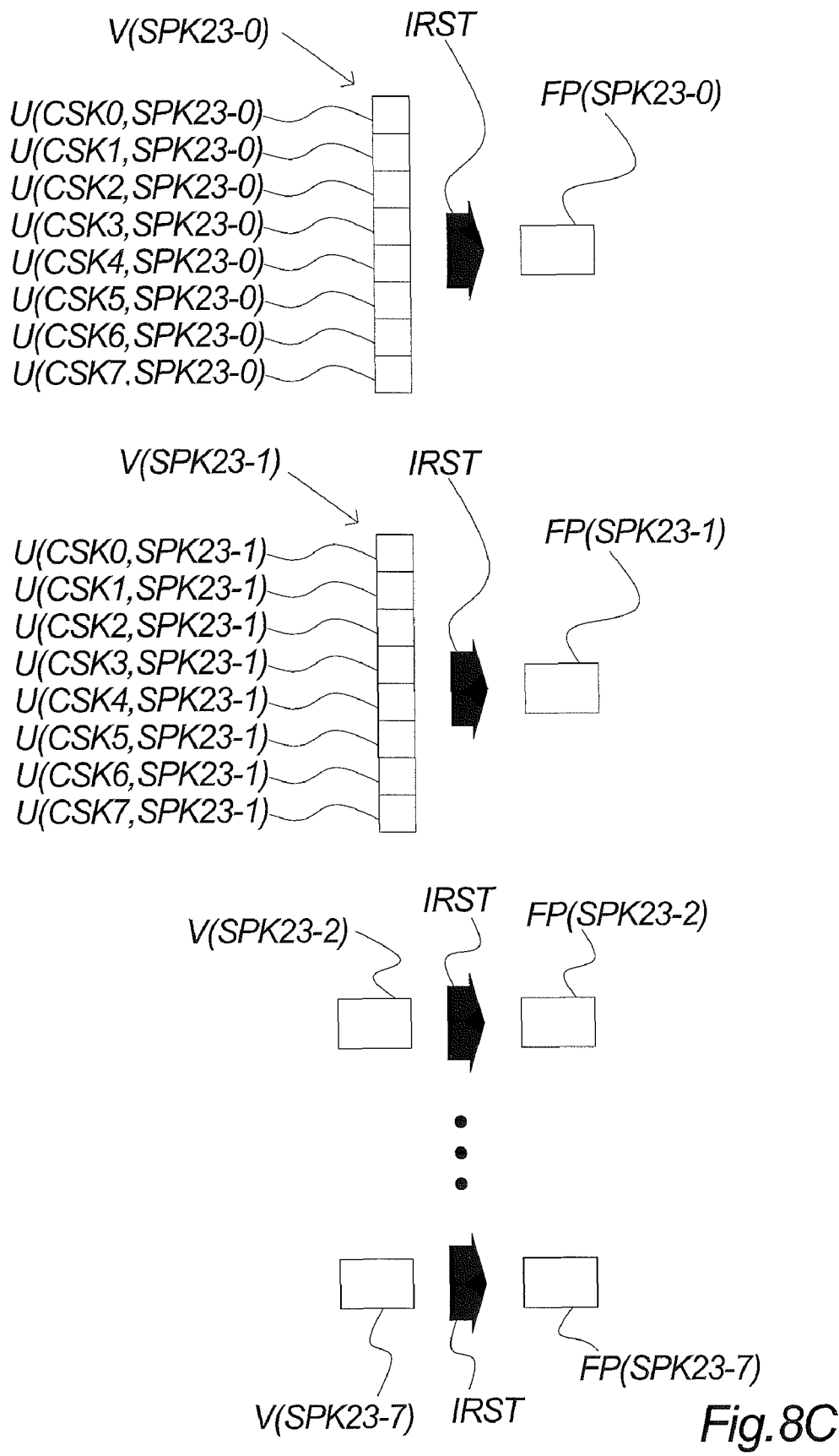

FIGS. 8A to 8C illustrate how the seed packets may be transformed into feed packets. FIG. 8A illustrates a collection of 8 seed packets SP(CSK0,SPK23) ... SP(CSK7,SPK23) collected by one peer represented by the number 23 from 8 of the code segment holding peers. The seed packets SP received is, thus, generated from 8 different code segments but on the basis of the same seed packet key SPK23. As each seed packet has a size of 1 kB the peer has received a total of 8 kB in order to collect 8 seed packets.

FIG. 8B illustrates a reordering of the seed packet parts comprised by the received seed packets. The reordering turns the 8 seed packets SP(CSK0,SPK23) ... SP(CSK7,SPK23) into 8 coded feed packets V(SPK23-0) ... V(SPK23-7). The reordering comprises arranging the seed packet parts U according to their seed packet sub-key rather than according to the code segment of origin. Thus, e.g., all seed packet parts U generated on the basis of the seed packet sub-key SPK23-0, i.e. seed packet parts U(CSK0,SPK23-0), U(CSK1,SPK23-0) ... U(CSK7,SPK23-0), are combined into a coded feed packet V(SPK23-0). It is due to this reordering that it is important that the seed packets generated from each of the code segments for a certain peer are generated on the basis of corresponding seed packet keys.

As the seed packet parts U are simply rearranged, the size of the coded feed packets V is equal to the size of the seed packets SP.

FIG. 8C illustrates how the coded feed packets V(SPK23-0), V(SPK23-1) . . . V(SPK23-7) are transformed into feed packets FP(SPK23-0), FP(SPK23-1) . . . FP(SPK23-7). The decoding is performed by means of inverse Reed-Solomon transformers IRST. The size of the feed packets FP is the same as the size of the seed packets SP, i.e. 1 kB corresponding to 1/64 of the size of the input data I in the present example.

One important property of the feed packets FP generated by the method of the present example is that the delivered data DD which preferably is equal to the input data I may be established by means of inverse Reed-Solomon transformation IRST from any 64 unique feed packets FP. As the peer represented by the number 23 establishes 8 feed packets in the above example, 56 more feed packets should be established by the peer or collected from other peers in order to enable the peer to establish the delivered data DD.

Figure 9:
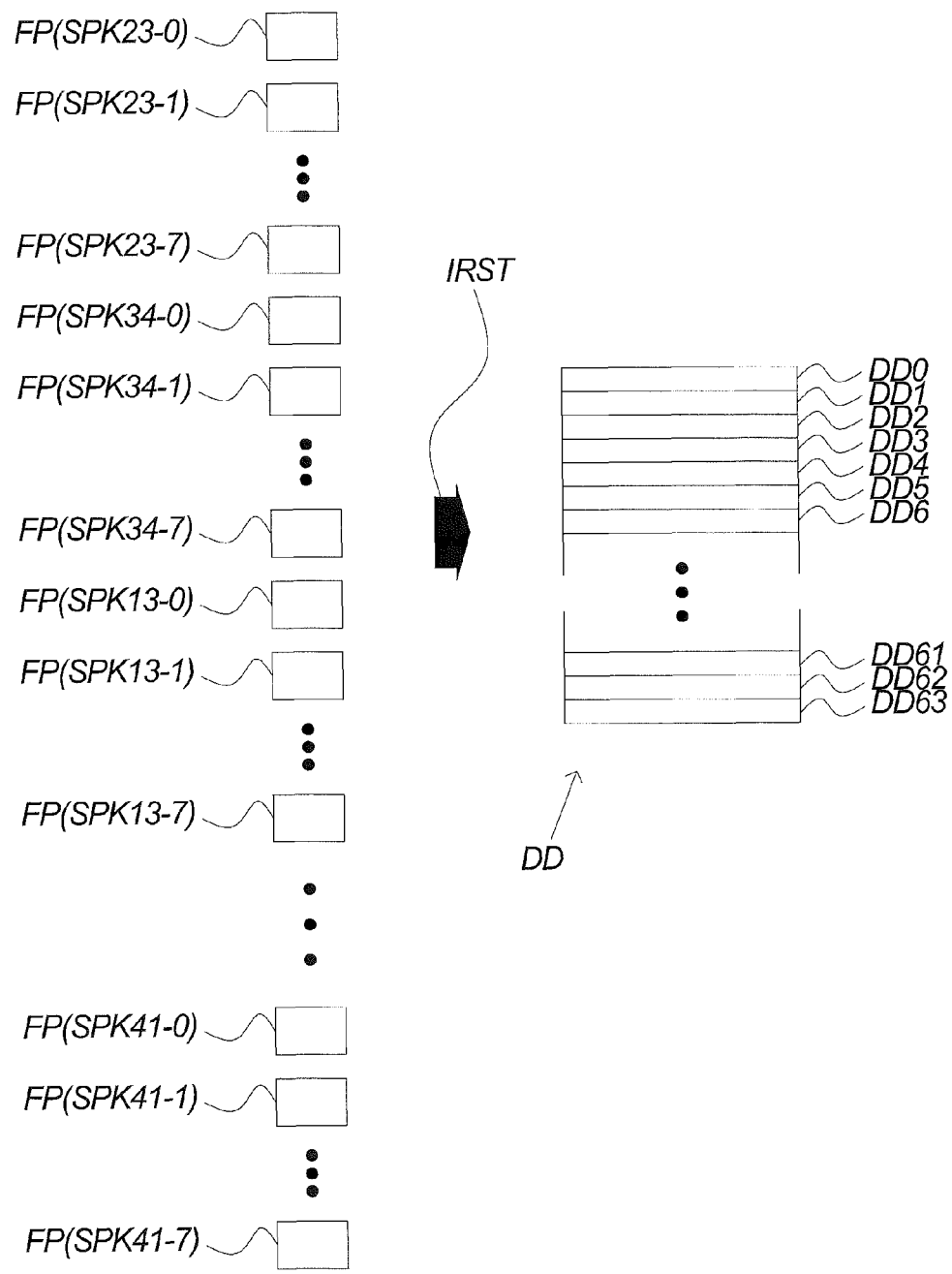

FIG. 9 illustrates how a certain number of feed packets FP enables the establishment of delivered data DD. In the FIG. 8 feed packets FP(SPK23-0), FP(SPK23-1) . . . FP(SPK23-7) from peer 23, 8 feed packets FP(SPK34-0), FP(SPK34-1) . . . FP(SPK34-7), etc., i.e. a total of 64 feed packets from different feed packet establishing peers may be transformed into delivered data DD by means of inverse Reed-Solomon transformation.

Figure 10:
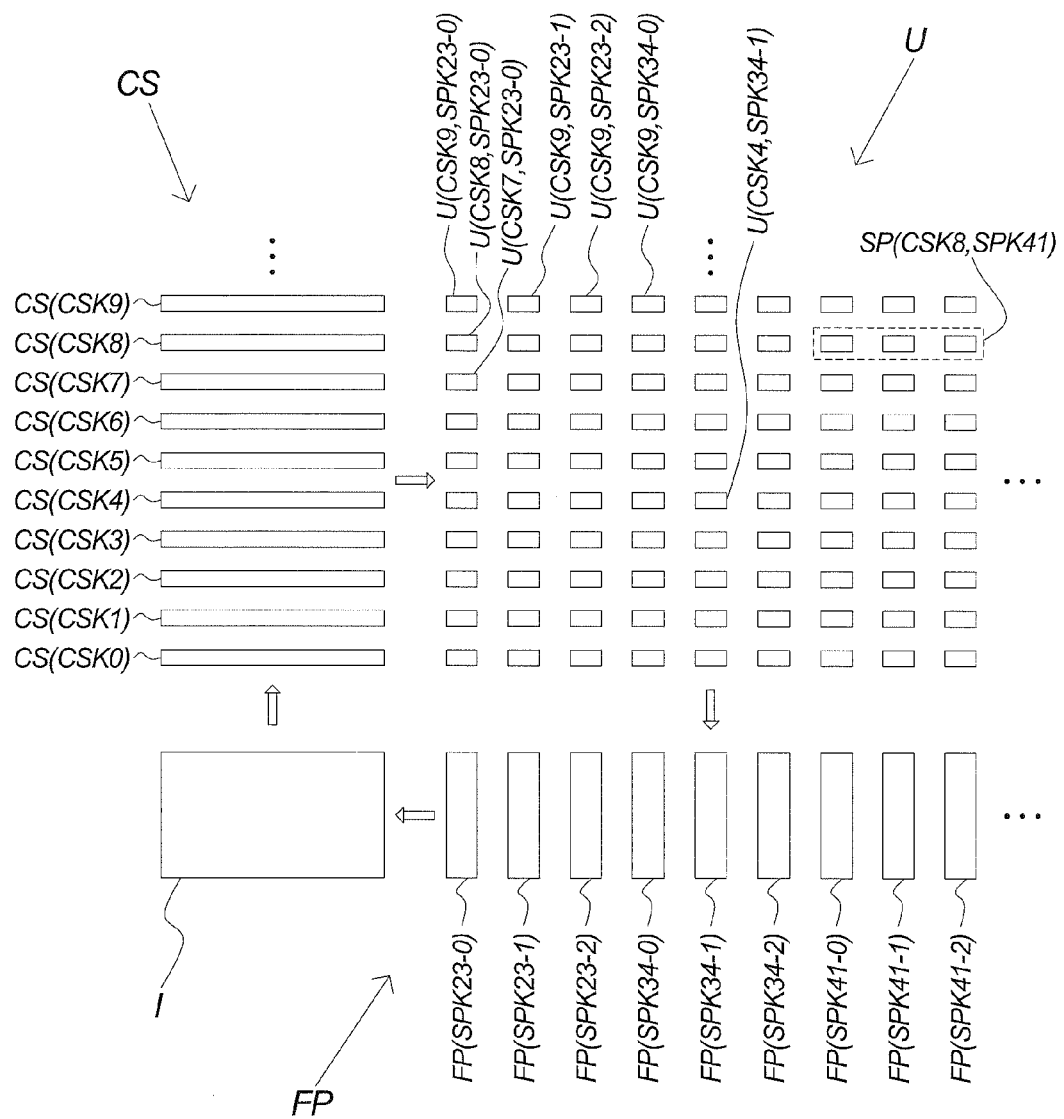

FIG. 10 illustrates the circular nature of the encoding and decoding techniques of the embodiment of the invention described above with reference to FIGS. 6A to 9, i.e. an embodiment using Reed-Solomon based encoding. It shows how the input data I is used for generating code segments CS as described with reference to FIGS. 6A to 6D. Furthermore, it shows how code segments CS are used for generating seed packet parts U, a certain number of which within the same row is referred to as seed packets SP, as described with reference to FIGS. 7A and 7B. Furthermore, it shows how seed packet parts U are transformed into feed packets FP, as described with reference to FIGS. 8A to 8C. And it finally shows how feed packets FP are transformed into the input I, also referred to as delivered data DD, as described with reference to FIG. 9.

In FIG. 10 is shown 10 code segments CS(CSK0) . . . CS(CSK9) with different keys CSK0 . . . CSK9. In theory, the possible number of code segments with unique keys is unlimited, indicated by the dots. From each code segment an in theory unlimited number of seed packet parts U may be generated. The keys used for generating the seed packet parts U are for practical reasons preferably determined by a grouping key, e.g. 23 or 34 in the present example, and a number of sub keys, e.g. 0, 1 or 2 in the present example. The sub keys are preferably generated from the grouping keys by means of a pseudo random process. The practical requirement of a certain degree of synchronization rises because a feed package FP is generated from seed packet parts U having different code segment keys but equal seed packet keys, i.e. equal combination of grouping key and sub key.

In FIG. 10 is, furthermore, shown, 9 feed packets FP(SPK23-0) . . . FP(SPK41-2), transformed by seed packet parts U having different code segment keys SPK but equal grouping key—sub key combinations, e.g. SPK23-0 or SPK 41-1 in the present example. In the figure is, furthermore, shown an example of a seed packet SP(CSK8,SPK41) comprising seed packet parts U(CSK8,SPK41-0), U(CSK8, SPK41-1) and U(CSK8,SPK41-2).

Figure 11:
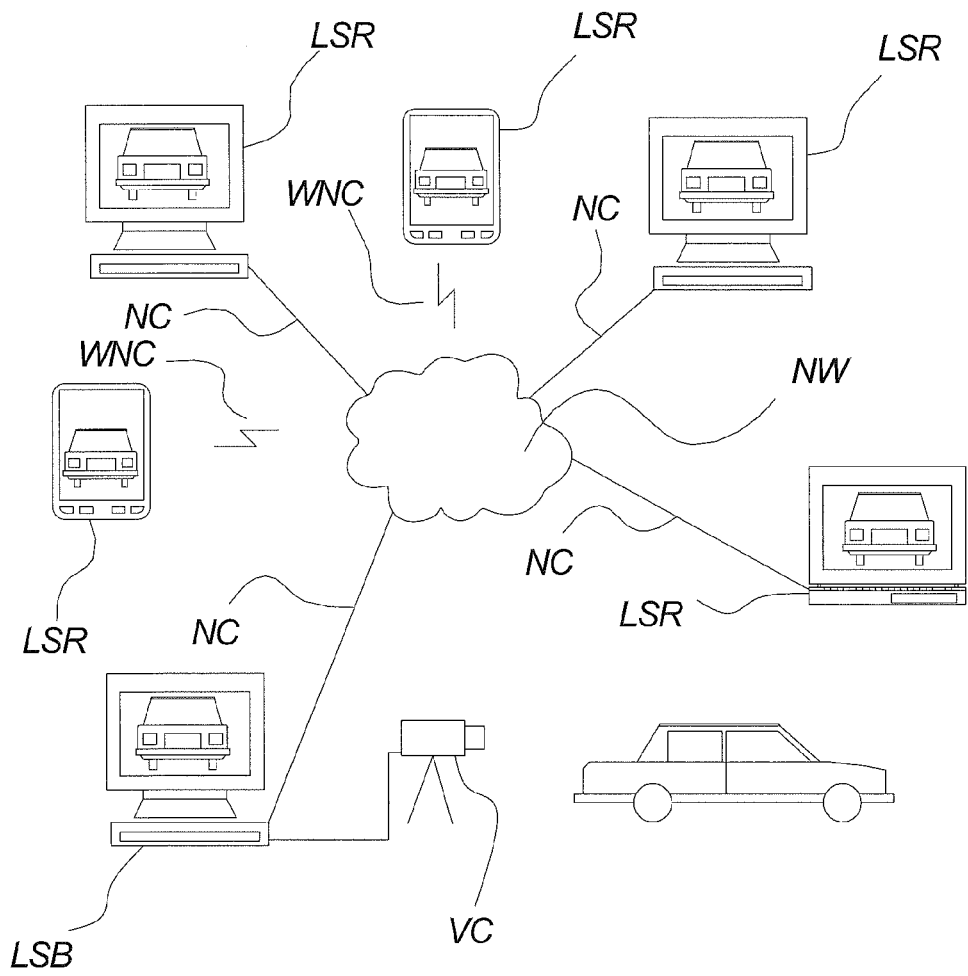

FIG. 11 illustrates a preferred application of the network and distribution method of the present invention. The application relates to live streaming of content, e.g. video and/or audio, to several peers connected to a network, e.g. the Internet.

In FIG. 11 is shown a live streaming broadcaster LSB shown as a computer. To the live streaming broadcaster LSB a video camera VC is connected. The video stream recorded by the video camera is, thus, available to the live streaming broadcaster LSB illustrated in FIG. 11 by the picture on the computer monitor. The live streaming broadcaster LSB is, furthermore, connected by a network connection NC to a network NW.

To the network NW a number of live streaming recipients LSR are also connected. The live streaming recipients may be any kind of network-enabled devices and are, thus, in FIG. 11 shown as computers, laptops and personal digital assistants (PDA's). The live streaming recipients may be connected to the network by any connecting means and the PDA's are, thus, in FIG. 11 illustrated as being connected by a wireless network connection WNC.

Applying the system and method of the present invention to the network and peers of FIG. 11 makes it possible for each of the live streaming recipients LSR to receive the video stream recorded by the video camera VC connected to the live streaming broadcaster LSB in an advantageous way, using grid-technology and loss resilient transmission.

It is noted that the example given in FIG. 11 is merely one possible embodiment of the present invention and it is within the scope of the present invention to use any source of live streaming content, e.g. different types of cameras and microphones, playback devices, audio or video mixers, stored multimedia files, etc., instead of or in combination with the video camera VC, any kind of network-enabled device comprising processing means, e.g. computers, laptops, PDA's, mobile phones, servers, dedicated processing means, e.g. digital signal processors, programmable gate arrays, etc., network routers, etc., instead of or in combination with the live streaming broadcaster LSB and live streaming recipients LSR, and any kind of networks and network connections instead of or in combination with the network NW, network connections NC and/or wireless network connections WNC shown in FIG. 11. Furthermore, even though the present embodiment is especially advantageous for distributing live streaming, e.g. audio and/or video via the Internet, it may as well be used for distributing any kind of content, e.g. large data files, databases, computer programs, video or audio files, still pictures, etc.

In the embodiment of FIG. 11 the live streaming broadcaster LSB may embody the input broadcaster IB, distributing peer DP or peer P1 described above with reference to FIGS. 1 to 5 and also optionally one or more of the further peer categories described above. The live streaming recipients LSR may each embody any one or more of the peers P, intermediate peers IP, client peers CP, and/or peers P2, P3, P4 and P5. They may furthermore comprise the functionality of the live streaming broadcaster LSB for use in a different session or simultaneously.

In a preferred embodiment, the live streaming broadcaster LSB comprises at least the functionality of generating code segments CS from the input data I, and the live streaming recipients LSR all at least comprises the functionality of transforming a number of feed packets into delivered data DD, i.e. input data I. The objective of generating seed packets SP from a code segment CS is in a preferred embodiment assigned to a certain number of live streaming recipients or other peers, but the ability to do it may indeed be comprised by any of the peers. The objective of transforming a number of seed packets SP into feed packets FP is preferably assigned to all recipients but may in alternative embodiments as well be reserved a certain number of peers.

It is noted that the live streaming application or any other application of the present invention may be based on Reed-Solomon based loss resilient transmission or any other kind of loss resilient transmission or forward error correcting transmission, e.g. Tornado based, LT-based or Raptor-based encoding.

It is, furthermore, noted that according to the present invention the term live streaming is to be understood broadly. It may, thus, basically apply to at least the following two situations. A first set-up where information is streamed substantially at the same time as it becomes available, e.g. when streaming a live TV-show, a soccer match or data from a data acquisition device, but not necessarily displayed on a monitor or used by the recipient at that same time, i.e. it may be stored at the recipients location for future use and/or presented immediately, thus obtaining that the streaming is substantially synchronized with the creation of the information. And a second set-up where the broadcaster has access to stored information, e.g. a movie, audio files or a computer program, and the information is streamed substantially in step with the information being displayed or used by the recipient, i.e. the streaming being substantially synchronized with the actual use of the information. In between or in addition to these set-ups are several additional possibilities, e.g. time-shifted streaming of live events. A further set-up within the scope of the term live streaming according to the present invention comprises several recipients receiving a stream substantially synchronously, independently of the kind content of the stream, e.g. a live event, a movie, database updates, a computer program, etc.

A further advantageous embodiment of the present invention is a resilient distributed database. An example of such an embodiment may comprise a database of 1000 MB of data which by the broadcaster is divided into three code segments, each of size 500 MB. These three code segments may be placed in geographically different locations, where it for this example is assumed that at least two of the, e.g., computers holding the code segments are active at any time. For instance each code segment may be stored in a computer that is active for at least 16 hours per day with the remaining time closed for maintenance such that inactive time slots do not overlap between the three computers.

One or more distributed peers may now at any time download data in the form of seed packets, e.g. of size 500 kB, i.e., a single peer may download 500 kB originating from any two available code segments of the three possible. The peer may then transform this data to a single feed packet UPR of 1 MB ready for subsequent use, e.g. distribution, decoding or other applications, e.g. backup, etc. Any peer with access to a subset W comprising 1000 different such created feed packets UPR each of 1 MB is able to reconstruct the database in the case the encoding is based on Reed-Solomon principles. For other types of encoding, it may be necessary to collect a little more than 1000 packets before it is with high probability possible to reconstruct the database. Furthermore, it may be desirable to let some of the feed packets UPR be directly generated from the database, i.e., directly by the broadcaster, for instance if it is necessary to use standard multicast for delivery of, e.g., 100 packets directly to peers all having more than 900 feed packets but less than 1000 in order for them to regenerate the database.

An advantageous feature of the above-mentioned embodiment regards the necessary space at the different code segment holding, as, after the database is divided into e.g., three code segments, it is possible to generate feed packets UPR from any or all of these code segments without access the other code segments, i.e. with access to only, e.g., 500 MB storage space.

A further advantageous feature of the above-mentioned embodiment is secure, i.e. secret, transmission of data. As the encoding can be implemented such that a peer that has received less than, e.g., 999 MB of information in the form of feed packets UPR or with a storage capacity below this threshold is not able to regenerate any part of the database. Hence, it is possible to distribute the 1000 MB data of the database in a secure and still loss resilient way as the peers altogether may establish and collect far more than the required amount of packets as long as no individual non-authorized peer is able to collect the required amount.

A further alternative embodiment of the present invention features feed packet transformation load balancing. An example of such an embodiment comprises establishing, e.g., three code segments of each, e.g., 500 MB from a, e.g., 1000 MB database, and store all three code segments within a single peer. This single peer may then use three separate processors or threads in a hyper threading architecture, each possibly having access to only a separate limited storage capacity of 500 MB, in order to produce feed packets UPR in parallel. This may e.g. be used in a set-up where the feed packets are delivered through multicast to a plurality of peers, other processors or other threads. The computational resources needed for this are thus balanced to three processing units, e.g. three different CPUs, possibly each with limited storage access. In addition this may facilitate computer architectures with possibly faulty computations, e.g. biochips, neural networks or faulty extreme high speed CPUs, still generating correct feed packets even if only two of the three separate computations are correct.

An even further embodiment of the present invention features a restricted data access policy, where individual peers or groups of peers may only gain access to the data when cooperating with other peers or groups of peers according to specifically defined policies. In this example of such an embodiment it is assumed that the peers are grouped into four groups of different peers, where each group has at least one peer. The broadcaster IB establishes from a data-block of 1000 MB two code segments of each 500 MB and transmits these code segments to two different locations Q1 and Q2 and then destroys the original data. Each of the locations Q1 and Q2 is then restricted to establish not more than 165 MB different seed packets, or alternatively feed packets UPR, for each group of peers. Hence, in total, no peer group can get more than 330 MB, i.e. 165 MB from each location Q1, Q2, of non-redundant data. Hence, a peer group can transform received data to no more than 330 MB of data in the form of non-redundant feed packets UPR. The peers within the peer group may very well replicate the established feed packets but may never obtain more than 330 MB non-redundant feed packets. Hence, for a peer to reconstruct the database it is always necessary to collect data from all four different peer groups in order to collect more than 1000 MB unique feed packets UPR. That is, it may get 330 MB feed packets UPR from its own group or by transforming received data from Q1 and Q2 and then receive 330 MB feed packets UPR from peers in two different groups, and 10 MB from peers in the last of the four groups. Alternatively, it may receive 250 MB data each from four different groups or any other arrangement. Hence, this embodiment enables distribution of data in such a way that it is possible to have the data distributed among several peers, but still guaranteeing that it can only be reproduced by a peer belonging to a group where three other groups have agreed that this group of peers may be allowed to reproduce the database. Note that no part of the system has full knowledge of the database after IB has destroyed it and before at least four peers spread over at least four groups have agreed to exchange data.

In an alternative embodiment where the peers of one group do not know any peers of other groups and, thus, have no possibilities of obtaining the full data amount, a central peer, e.g. a server, comprising knowledge of all peer groups, may at its own discretion allow some or all of the peers to collect the necessary feed packets by submitting contact information of the necessary other peers. Thereby, it is possible to establish the desirable intermediate state of distribution illustrated in FIG. 2 and still control who has access to the data, as well as when they have. This may, e.g., be used for distributing a movie or a new version of a game or computer programme before it is actually released for use.

The invention claimed is:

1. A data streaming system comprising
at least one data streaming broadcaster (LSB), and
at least two streaming recipients (LSR),
said at least two streaming recipients (LSR) forming at least a part of a peer-to-peer streaming network;
wherein said at least two streaming recipients (LSR) each comprise a means for generating peer-to-peer streaming of content to other streaming recipients (LSR) of said peer-to-peer streaming network and wherein said peer-to-peer streaming of content to other streaming recipients (LSR) comprises loss resilient code representations of data from said at least one streaming broadcaster (LSB);
wherein at least one of said at least two streaming recipients (LSR) comprises a multicast receiver for receiving by multicast delivery loss resilient code representations of said data from said at least one streaming broadcaster (LSB).

2. The data streaming system according to claim 1, wherein each of said at least two streaming recipients (LSR) provides at least one unique partial encoded representation (UPR) of Input Data (I) by said means for generating peer-to-peer streaming of content to other streaming recipients (LSR).

3. The data streaming system according to claim 2, wherein at least two of said unique partial encoded representations (UPR) collectively form a complete representation of the Input Data (I).

4. The data streaming system according to claim 1, wherein said means for generating peer-to-peer streaming of content to other streaming recipients (LSR) substantially provides M unique partial encoded representations (UPR) of Input Data (I) and wherein the streamed data from the streaming broadcaster (LSB) is fully or substantially represented by a subset of N unique partial encoded representations (UPR).

5. The data streaming system according to claim 1, wherein the streamed data from the at least one streaming broadcaster (LSB) is fully represented by a subset of N unique partial encoded representations (UPR) encoded by Reed-Solomon based loss resilient code segments.

6. The data streaming system according to claim 1, wherein the streamed data from the streaming broadcaster (LSB) is substantially represented by a subset of N unique partial encoded representations (UPR) encoded by LT-based based loss resilient code segments.

7. The data streaming system according to claim 1, wherein said loss resilient code representations of data are provided in frames.

8. The data streaming system according to claim 7, wherein said frames comprise time frames substantially produced and transmitted sequentially by said streaming broadcaster (LSB).

9. The data streaming system according to claim 1, wherein the streaming of data from said at least one streaming broadcaster (LSB) is structured in consecutive frames and wherein substantially each of the frames is initiated by an initial transmission of data representations to said at least two streaming recipients (LSR), and wherein said at least two streaming recipients (LSR) stream said data representations or derivatives thereof to others of the streaming recipients (LSR) as loss resilient code segments, and wherein the others of the streaming recipients (LSR) gather a number N of unique loss resilient code segments and regenerate said frames transmitted from said at least one streaming broadcaster (LSB) as a streaming signal.

10. The data streaming system according to claim 1, wherein said data comprises at least one of video and audio streams.

11. A network comprising
at least one Input Data (I) broadcaster (IB), and
a plurality of peers (P),
said plurality of peers (P) transforming Input representative data (IRD) from said at least one Input broadcaster (IB) into a first part of a plurality of M unique partial encoded representations (UPR) of Input Data (I),
at least one of said at least one Input Data (I) broadcaster (IB) transforming Input representative data (IRD) from said at least one Input broadcaster (IB) into a second part of said plurality of M unique partial encoded representations (UPR) of Input Data (I),
wherein a plurality of code subsets (W1, W2, W3, . . . ) of said M unique partial encoded representations comprises N different unique partial encoded representations (UPR) of said Input Data (I), each of the code subsets (W1, W2, W3, . . . ) representing said Input Data (I) and where N is less than M−1.

12. The network according to claim 11, wherein each of said plurality of peers (P) produces one of said M unique partial encoded representations (UPR) of Input Data (I).

13. The network according to claim 11, wherein at least one of said code subsets (W1, W2, W3 . . . ) represents an encoded version of said Input Data (I).

14. The network according to claim 11, wherein at least one of said code subsets (W1, W2, W3 . . . ) is encoded by means of LT based codes.

15. The network according to claim 11, wherein at least one of said code subsets (W1, W2, W3 . . . ) is encoded by means of Reed-Solomon based codes.

16. The network according to claim 11, wherein said network further comprises at least two recipient peers (RP), the at least two recipient peers (RP) gathering at least one of said code subsets (W1, W2, W3 . . . ) and decoding the at least one of said code subsets (W1, W2, W3 . . . ) into data corresponding to the encoded data.

17. The network according to claim 16, wherein the gathering performed by said at least two recipient peers (RP) is performed on the basis of a request to at least one of the other peers.

18. The network according to claim 16, wherein the gathering performed by said at least two recipient peers (RP) is performed on the basis of a push transmission performed by at least one of the plurality of peers (P).

19. The network according to claim 11, wherein at least one of said plurality of peers (P) forms a recipient peer (RP).

20. The network according to claim 11, wherein said input representative data (IRD) is established at least partly by at least two intermediate peers (IP).

21. The network according to claim 20, wherein said intermediate peers (IP) comprise further intermediate processing steps adapted for establishment of input representative data (IRD).

22. The network according to claim 11, wherein at least one of said plurality of peers (P) forms an intermediate peer (IP).

23. The network according to claim 11, wherein the total number of peers (P) is greater than 5, and the number of intermediate peers (IP) is between ⅕ and ¹⁄₁₀₀ of the total number of peers (P).

24. The network according to claim 11, wherein said input representative data (IRD) is transmitted from said broadcaster (IB) to at least two intermediate peers (IP).

25. The network according to claim 24, wherein said at least two intermediate peers (IP) receive only a partial representation of said Input Data (I).

26. The network according to claim 11, wherein the unique partial encoded representations (UPR) are generated by a plurality of different peers from the plurality of peers (P).

27. The network according to claim 11, wherein the uniqueness of the unique partial encoded representations (UPR) are ensured by producing the partial encoded representations (UPR) by different peers of the plurality of peers (P).

28. The network according to claim 11, wherein at least one peer of the plurality of peers (P) collects and transforms input representative data (IRD) into at least one unique partial encoded representation by a pull process.

29. The network according to claim 11, wherein at least one peer of the plurality of peers (P) collects and transforms input representative data (IRD) into at least one unique partial encoded representation by a push process.

30. The network according to claim 11, wherein said Input Data (I) is transmitted from the at least one Input Data (I) broadcaster (IB) on a real-time basis.

31. The network according to claim 11, wherein said Input Data (I) is transmitted from the at least one Input Data (I) broadcaster (IB) on a real-time basis in frames.

32. The network according to claim 11, wherein said network is a video streaming network.

33. The network according to claim 11, wherein said network is performing video-streaming on demand.

34. The network according to claim 11, wherein said network is performing live-video streaming.

35. The network according to claim 11, wherein said network is formed by the Internet and said plurality of peers (P) comprises computers communicating with the Internet.

36. The network according to claim 11, wherein at least one of said plurality of peers (P) comprises a computer transforming input representative data (IRD) into at least one unique partial encoded representation (UPR) of Input Data (I) without gathering and utilizing partial encoded representation (UPR) of Input Data (I) produced by others of the plurality of peers (P).

37. The network according to claim 11, wherein at least one of said plurality of peers (P) switches between:
   at least one mode, where the at least one of said plurality of peers (P) both produces at least one partial encoded representation (UPR) and gathers partial encoded representations produced by others of the plurality of peers (P) to obtain at least one code subset (W1, W2, W3,) and decodes the at least one code subset (W1, W2, W3,); and
   at least one idle mode, where the at least one of said plurality of peers (P) acts solely or primarily as a producer of at least one partial encoded representation (UPR).

38. The network according to claim 11, wherein the plurality of peers (P) are implicitly or explicitly defined in the input data (I).

39. The network according to claim 11, wherein the encoded input data (I) is associated with peer defining data.

40. The network according to claim 11, wherein said unique partial encoded representations (UPR) comprise loss resilient codes.

41. The network according to claim 11, wherein said Input Data (I) comprises video streaming, said broadcaster (IB) comprises a video streaming broadcaster, and at least two of said plurality of peers (P) comprise recipients of video streams.

42. A method of streaming data in a streaming system comprising at least one data streaming broadcaster (LSB) and at least two streaming recipients (LSR), the method comprising
   forming at least a part of a peer-to-peer streaming network with said at least two streaming recipients (LSR), and
   generating peer-to-peer streaming of content to other streaming recipients (LSR) of said peer-to-peer streaming network with said at least two streaming recipients (LSR),
   wherein said peer-to-peer streaming of content to other streaming recipients (LSR) is established by means of loss resilient code representations of data from said at least one streaming broadcaster (LSB); and
   generating multicast streaming of content to the streaming recipients (LSR) of said peer-to-peer streaming network wherein said multicast streaming of content is established by means of loss resilient code representations of data from said at least one streaming broadcaster (LSB).

43. A method of distributing input data (I) in a network comprising at least one Input Data (I) broadcaster (IB) and a plurality of peers (P), the method comprising
   transforming, with said plurality of peers (P), Input representative data (IRD) from said at least one Input broadcaster (IB) into a first part of a plurality of M unique partial encoded representations (UPR) of the Input Data (I),
   transforming Input representative data (IRD) from said at least one Input broadcaster (IB) into a second part of said plurality of M unique partial encoded representations (UPR) of Input Data (I),
   wherein a plurality of code subsets (W1, W2, W3, . . . ) of said M unique partial encoded representations comprises N different unique partial encoded representations (UPR) of said Input Data (I), each subset (W1, W2, W3, . . . ) representing said Input Data (I) and where N is less than M−1.

44. A data streaming system comprising
   at least one data streaming broadcaster (LSB), and
   at least two streaming recipients (LSR),
   said at least two streaming recipients (LSR) forming at least a part of a peer-to-peer streaming network,
   wherein said at least two streaming recipients (LSR) each comprise a means for generating peer-to-peer streaming of content to other streaming recipients (LSR) of said peer-to-peer streaming network, said peer-to-peer streaming of content to other streaming recipients (LSR) comprises loss resilient code representations of data from said at least one streaming broadcaster (LSB), and wherein at least one of said at least one data streaming broadcaster (LSB) comprises a means for generating multicast streaming of content to streaming recipients (LSR) of said peer-to-peer streaming network, said multicast streaming of content to streaming recipients (LSR) comprises loss resilient code representations of data from said at least one streaming broadcaster (LSB), and wherein said means for generating peer-to-peer streaming of content to other streaming recipients (LSR) and said means for generating multicast streaming of content to streaming recipients (LSR), substantially provide collectively M unique partial encoded representations (UPR) of Input Data (I), and wherein the number M substantially corresponds to the number of streaming recipients (LSR).

45. The data streaming system according to claim 44, wherein each of said at least two streaming recipients (LSR) provides at least one unique partial encoded representation (UPR) of Input Data (I) by said means for generating peer-to-peer streaming of content to other streaming recipients (LSR).

46. The data streaming system according to claim 45, wherein at least two of said unique partial encoded representations (UPR) collectively form a complete representation of the Input Data (I).

47. The data streaming system according to claim 44, wherein the streamed data from the streaming broadcaster (LSB) is fully or substantially represented by a subset of N unique partial encoded representations (UPR).

48. The data streaming system according to claim 44, wherein the streamed data from the at least one streaming broadcaster (LSB) is fully represented by a subset of N unique partial encoded representations (UPR) encoded by Reed-Solomon based loss resilient code segments.

49. The data streaming system according to claim 44, wherein the streamed data from the streaming broadcaster (LSB) is substantially represented by a subset of N unique partial encoded representations (UPR) encoded by LT-based based loss resilient code segments.

50. The data streaming system according to claim 44, wherein at least one of said at least two streaming recipients (LSR) regenerates the encoded data from said streaming broadcaster (LSB) by decoding a number N unique partial encoded representations (UPR) of data, and wherein at least one of said N unique partial encoded representations (UPR) is generated by the other streaming recipients (LSR).

51. The data streaming system according to claim 44, wherein the streaming of data from said at least one streaming broadcaster (LSB) is structured in consecutive frames and wherein substantially each of the frames is initiated by an initial transmission of data representations to said at least two streaming recipients (LSR), and wherein said at least two streaming recipients (LSR) stream said data representations or derivatives thereof to others of the streaming recipients (LSR) as loss resilient code segments, and wherein the others of the streaming recipients (LSR) gather a number N of unique loss resilient code segments and regenerate said frames transmitted from said at least one streaming broadcaster (LSB) as a streaming signal.

52. The data streaming system according to claim 44, wherein said peer-to-peer streaming network comprises a grid based system.

53. The data streaming system according to claim 44, wherein said data comprises at least one of video and audio streams.

54. A data streaming system comprising
at least one data streaming broadcaster (LSB), and
at least two streaming recipients (LSR),
said at least two streaming recipients (LSR) forming at least a part of a peer-to-peer streaming network,
wherein said at least two streaming recipients (LSR) each comprise a means for generating peer-to-peer streaming of content to other streaming recipients (LSR) of said peer-to-peer streaming network, and wherein said peer-to-peer streaming of content to other streaming recipients (LSR) comprises loss resilient code representations of data transmitted by said at least one streaming broadcaster (LSB), and
wherein at least one of said at least two streaming recipients (LSR) regenerates the encoded data from said streaming broadcaster (LSB) by decoding a number N unique partial encoded representations (UPR) of data and wherein at least one of said N unique partial encoded representations (UPR) is generated by the other streaming recipients (LSR) and at least one other of said N unique partial encoded representations (UPR) is received by multicast delivery.

55. The data streaming system according to claim 54, wherein each of said at least two streaming recipients (LSR) provides at least one unique partial encoded representation (UPR) of Input Data (I) by said means for generating peer-to-peer streaming of content to other streaming recipients (LSR).

56. The data streaming system according to claim 54, wherein at least two of said unique partial encoded representations (UPR) collectively form a complete representation of the Input Data (I).

57. The data streaming system according to claim 54, wherein said means for generating peer-to-peer streaming of content to other streaming recipients (LSR) substantially provides M unique partial encoded representations (UPR) of Input Data (I), and wherein the streamed data from the streaming broadcaster (LSB) is fully or substantially represented by a subset of N unique partial encoded representations (UPR).

58. The data streaming system according to claim 54, wherein the number M substantially corresponds to the number of streaming recipients (LSR).

59. The data streaming system according to claim 54, wherein the streamed data from the at least one streaming broadcaster (LSB) is fully represented by a subset of N unique partial encoded representations (UPR) encoded by Reed-Solomon based loss resilient code segments.

60. The data streaming system according to claim 54, wherein the streamed data from the at least one streaming broadcaster (LSB) is substantially represented by a subset of N unique partial encoded representations (UPR) encoded by LT-based based loss resilient code segments.

61. The data streaming system according to claim 54, wherein the streaming of data from said at least one streaming broadcaster (LSB) is structured in consecutive frames and wherein substantially each of the frames is initiated by an initial transmission of data representations to said at least two streaming recipients (LSR), and wherein said at least two streaming recipients (LSR) stream said data representations or derivatives thereof to others of the streaming recipients (LSR) as loss resilient code segments, and wherein the others of the streaming recipients (LSR) gather a number N of unique loss resilient code segments and regenerate said frames transmitted from said at least one streaming broadcaster (LSB) as a streaming signal.

62. The data streaming system according to claim 54, wherein said peer-to-peer streaming network comprises a grid based system.

63. The data streaming system according to claim 54, wherein said data comprises at least one of video and audio streams.

64. A method of receiving data from a broadcaster in a network, the method comprising the steps of:
  receiving a plurality of peer-to-peer delivered loss resilient code representations of said data,
  receiving a plurality of multicast delivered loss resilient code representations of said data,
  regenerating said data from said broadcaster by decoding a combination of said plurality of peer-to-peer delivered loss resilient code representations and said plurality of multicast delivered loss resilient code representations.

65. A network comprising at least one multicast stream of loss resilient data and a plurality of peer-to-peer transmitted loss resilient data, wherein a combination of a part of the loss resilient data from the multicast stream with a part of the plurality of peer-to-peer transmitted loss resilient data forms a data from a broadcaster.

* * * * *